(12) United States Patent
Callahan, II

(10) Patent No.: US 6,321,379 B1
(45) Date of Patent: Nov. 20, 2001

(54) METHOD AND SYSTEM FOR TARGET REGISTER ALLOCATION

(75) Inventor: Charles David Callahan, II, Seattle, WA (US)

(73) Assignee: Cray Inc., Seattle, WA (US)

( * ) Notice: Subject to any disclaimer, the term of this patent is extended or adjusted under 35 U.S.C. 154(b) by 0 days.

(21) Appl. No.: 09/221,287

(22) Filed: Dec. 23, 1998

(51) Int. Cl.[7] ........................................................ G06F 9/45

(52) U.S. Cl. .......................... 717/7; 717/2; 717/3; 717/4; 717/5; 717/6; 717/8; 717/9

(58) Field of Search .................................. 717/2, 3, 4, 5, 717/6, 7, 8, 9

(56) References Cited

U.S. PATENT DOCUMENTS

| | | |
|---|---|---|
| 4,819,234 | 4/1989 | Huber . |
| 4,872,167 | 10/1989 | Maezawa et al. . |
| 5,168,554 | 12/1992 | Luke . |

(List continued on next page.)

FOREIGN PATENT DOCUMENTS

| | | |
|---|---|---|
| 19710252 | 2/1998 | (DE) . |
| 0422945 | 4/1991 | (EP) . |
| 0455966 | 11/1991 | (EP) . |
| 0537098 | 4/1993 | (EP) . |
| 0855648 | 7/1998 | (EP) . |
| 0864979 | 9/1998 | (EP) . |
| 2307760 | 6/1997 | (GB) . |

OTHER PUBLICATIONS

George et al., "Iterated Register Coalescing", ACM, pp. 300–324, May 1996.*

Chow et al, "The Priority–Based Coloring Approach to Register Allocation", ACM, pp. 501–536, Oct. 1990.*

Briggs et al, "Cloning Heuristics for Register Allocation", ACM, pp. 275–284, Jun. 1989.*

Briggs et al, "Cloning Register Pairs", ACM, pp. 3–13, Mar. 1992.*

Kolte et al, "Load/Store Range Analysis for Global Register Allocation", ACM, pp. 268–277, Jun. 1993.*

(List continued on next page.)

*Primary Examiner*—Kakali Chaki
*Assistant Examiner*—Ted T. Vo
(74) *Attorney, Agent, or Firm*—Perkins Coie LLP

(57) ABSTRACT

A computer-based method and system for allocating target registers to branch operations and for determining the location of target definitions for the branch operations within a computer program. The target register allocation system of the present invention allocates a target register to be specified by each branch operation. The target register is to contain the address of the target that is loaded by the target definition. The target register allocation system determines a location in the computer program for a target definition such that whenever the branch operation is executed, the allocated target register contains the address of the target of the branch. The target allocation system may determine the location to be in a dominator block of the branch operation. The target allocation system may also determine the location a target definition so that the address of the target that is loaded by the target definition can be used by multiple branch operations. The target allocation system may also determine the location of the target definition based on execution frequency of locations. The target allocation system may, when a branch operation is in a loop, determine the location of the target definition to be outside the loop. The target allocation system may, when the program is a function, give preference to a non-callee save register in allocating a target register. The target allocation system may give preference to a callee save register of a function whose invocation is located in between the determined location and the location of the branch operation on a path of execution when allocating a target register.

34 Claims, 18 Drawing Sheets

U.S. PATENT DOCUMENTS

| | | |
|---|---|---|
| 5,504,932 | 4/1996 | Vassiliadis et al. . |
| 5,533,192 | 7/1996 | Hawley et al. . |
| 5,557,761 | 9/1996 | Chan . |
| 5,594,864 | 1/1997 | Trauben . |
| 5,632,032 | 5/1997 | Ault et al. . |
| 5,712,996 | 1/1998 | Schepers . |
| 5,754,855 | 5/1998 | Miller et al. . |
| 5,768,591 | 6/1998 | Robinson . |
| 5,774,721 | 6/1998 | Robinson . |
| 5,787,245 | 7/1999 | You et al. . |
| 5,805,892 | 9/1998 | Nakajima . |
| 5,812,811 | 9/1998 | Dubey et al. . |
| 5,867,643 | 2/1999 | Sutton . |
| 5,877,766 | 3/1999 | Bates et al. . |
| 5,887,166 | 3/1999 | Mallick et al. . |
| 5,901,315 | 5/1999 | Edwards et al. . |
| 5,903,730 | 5/1999 | Asai et al. . |
| 5,913,925 | 6/1999 | Kahle et al. . |
| 5,953,530 | 9/1999 | Rishi et al. . |
| 5,961,639 | 10/1999 | Mallick et al. . |
| 5,978,902 | 11/1999 | Mann . |
| 6,002,872 | 12/1999 | Alexander, III et al. . |
| 6,009,269 | 12/1999 | Burrows et al. . |
| 6,058,493 | 5/2000 | Talley . |
| 6,059,840 * | 5/2000 | Click, Jr. ................................. 717/9 |
| 6,072,952 * | 6/2000 | Janakiraman ............................ 717/9 |
| 6,094,716 | 7/2000 | Witt . |
| 6,101,524 | 8/2000 | Choi et al. . |
| 6,112,293 | 8/2000 | Witt . |
| 6,151,701 | 11/2000 | Humphreys et al. . |

OTHER PUBLICATIONS

Shim et al, "Spilt–Path Enhanced Pipeline Scheduling for Loops with Control Flows", IEEE, pp. 93–102, Dec. 1998.*

Callahan et al, "Register Allocation via Hierarchical Graph Coloring", ACM, pp. 192–203, Jun. 1991.*

Smith, Burton, "The End of Architecture," Keynote Address Presented at the 17th Annual Symposium on Computer Architecture, Seattle, Washington, May 29, 1990.

Richard Korry et al., "Memory Management in the Tera MTA System," 1995.

Smith, Burton, "Opportunities for Growth in High Performance Computing," Nov., 1994.

Gail Alverson et al., "Processor Management in the Tera MTA System," 1995.

Major System Characteristics of the TERA MTA, 1995.

Touzeau, Roy F., "A Fortran Compiler for the FPS–164 Scientific Computer," Proceedings of the ACM SIGPLAN '84 Symposium on Compiler Construction, SIGPLAN Notices 19(6):48–57, Jun. 1984.

Linton, Mark A., The Evolution of Dbx, USENIX Summer Conference, Jun. 11–15, 1990.

David Callahan and Burton Smith, A Future–Based Parallel Language for a General–Purpose Highly–Parallel Computer, Languages and Compilers for Parallel Computing, MIT Press, 1990.

David Callahan et al., "Improving Register Allocation for Subscripted Variables," Proceedings of the ACM SIGPLAN Conference on Programming Language Design and Implementation, White Plains, New York, Jun. 20–22, 1990.

Adelberg, Brad et al., "The Strip Rule System for Efficiently Maintaining Derived Data," Sigmod Record, Association for Computing Machinery, New York, vol. 26, No. 2, Jun. 1, 1997.

Surajit, Chaudhuri and Umeshwar Dayal, "An Overview of Data Warehousing and OLAP Technology," Sigmod Record, Association for Computing, New York, vol. 26, No. 1, Mar. 1997.

Agrawal, Gagan and Joel Saltz, "Interprocedural Data Flow Based Optimizations for Compilation of Irregular Problems," Annual Workshop on Languages and Compilers for Parallel Computing, 1995.

Callahan, David, "Recognizing and Parallellizing Bounded Recurrences," Aug. 1991.

D.H. Bailey et al., "The NAS Parallel Benchmarks—Summary and Preliminary Results," Numerical Aerodynamic Simulation (NAS) Systems Division, NASA Ames Research Center, California, 1991.

Robert Alverson et al., "The Tera Computer System,"Proceedings of 1990 ACM International Conference on Supercomputing, Jun. 1990.

Gail Alverson et al., "Scheduling on the Tera MTA," Job Scheduling Strategies for Parallel Processing, 1995.

Smith, Burton, The Quest for General–Purpose Parallel Computing.

Briggs, Preston and Keith D. Cooper, "Effective Partial Redundancy Elimination," ACM SIGPLAN Notices, Association for Computing Machinery, New York, vol. 29, No. 6, Jun. 1, 1994.

Click, Cliff, "Global Code Motion, Global Value Numbering," ACM SIGPLAN Notices, Association for Computing Machinery, New York, vol. 30, No. 6, Jun. 1, 1995.

Sreedhar, Vugranam C. and Guang R. Gao, "Incremental Computation of Dominator Trees," ACM SIGPLAN Notices, Association for Computing Machinery, New York, vol. 30, No. 3, Mar. 1, 1995.

Galarowicz, Jim et al., "Analyzing Message Passing Programs on the Cray T3E with PAT and VAMPIR," Research Report, "Online!", May 1998.

Anderson, Jennifer, et al., "Continuous Profiling: Where Have All The Cycles Gone?," Operating Systems Review, ACM Headquarters, New York, vol. 31, No. 5, Dec. 1, 1997.

Anderson, Gail et al., "Tera Hardware–Software Cooperation," Proceedings of Supercomputing 1997, San Jose, California, Nov. 1997.

Jack W. Davidson and David B. Whalley, "Reducing the Cost of Branches by Using Registers," Proceedings of the 17th Annual International Symposium on Computer Architecture, Seattle, Washington, May 28–31, 1990.

Knoop, Jens et al., "The Power of Assignment Motion," ACM SIGPLAN '95 Conference on Programming Language Design and Implementation, La Jolla, California, Jun. 18–21, 1995.

Agrawal, Hiralal, "Dominators, Super Blocks, and Program Coverage," 21st ACM SIGPLAN–SIGACT Symposium on Principles of Progamming Languages, Portland, Oregon, Jan. 17–21, 1994.

Thomas Lang and Miquel Huguet, "Reduced Register Saving/Restoring in Single–Window Register Files," Computer Architecture News, vol. 14, No. 3, Jun. 1986.

Tera MTA, Principles of Operation, Nov. 18, 1997.

Goldman, Kenneth J., "Introduction to Data Structures," 1996, (retrieved from Internet, http://www.cs.wustL.edu{kjg/CS101_SP97/Notes?DataStructures/structures. html.

A. Ram et al., "Parallel Garbage Collection Without Synchronization Overhead," 12th Annual Symposium on Computer Architecture, Jun. 17, 1985.

H. Hayashi et al., "ALPHA: A High Performance Lisp Machine Equipped with a New Stack Structure and Garbage Collection System," 10$^{th}$ Annual International Symposium on Computer Architecture, 1983.

Minwen, Ji, et al., Performance Measurements for Multi-threaded Programs, SIGMETRICS '98, ACM, 1998, pp. 168–170.

Cook, Jonathan E. and Alexander L. Wolf, "Event Based Detection of Concurrency," SIGSOFT '98, ACM, 1998, pp. 35–45.

Jenn–Yuan Tsai et al., "Performance Study of a Concurrent Multithreaded Processor," IEEE, 1998, pp. 24–35.

Method of Tracing Events in Multi–Threaded OS/2 Applications, IBM Tech., Disclosure Bulletin, Sep. 1993, pp. 19–22.

* cited by examiner

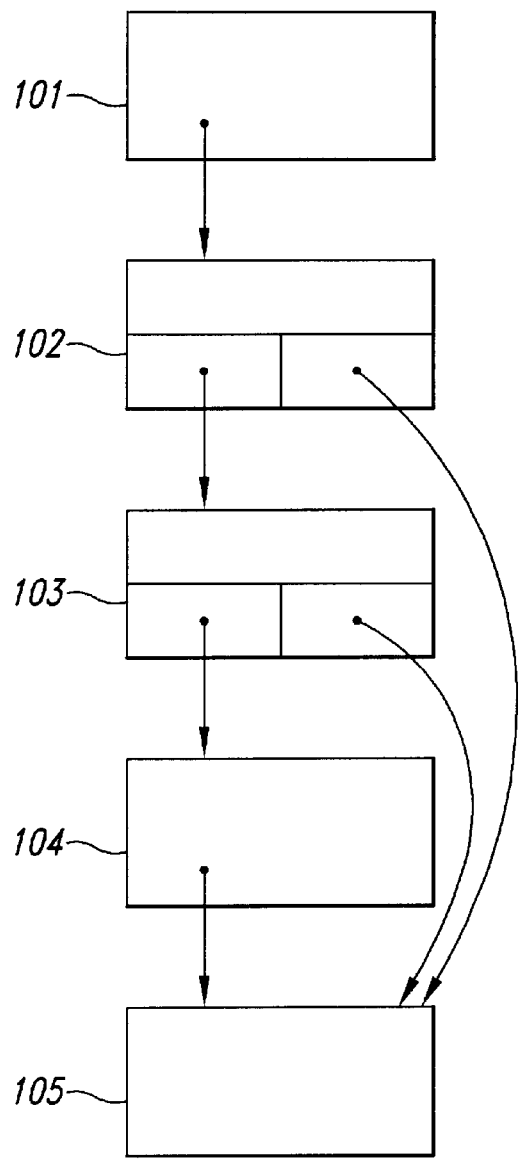
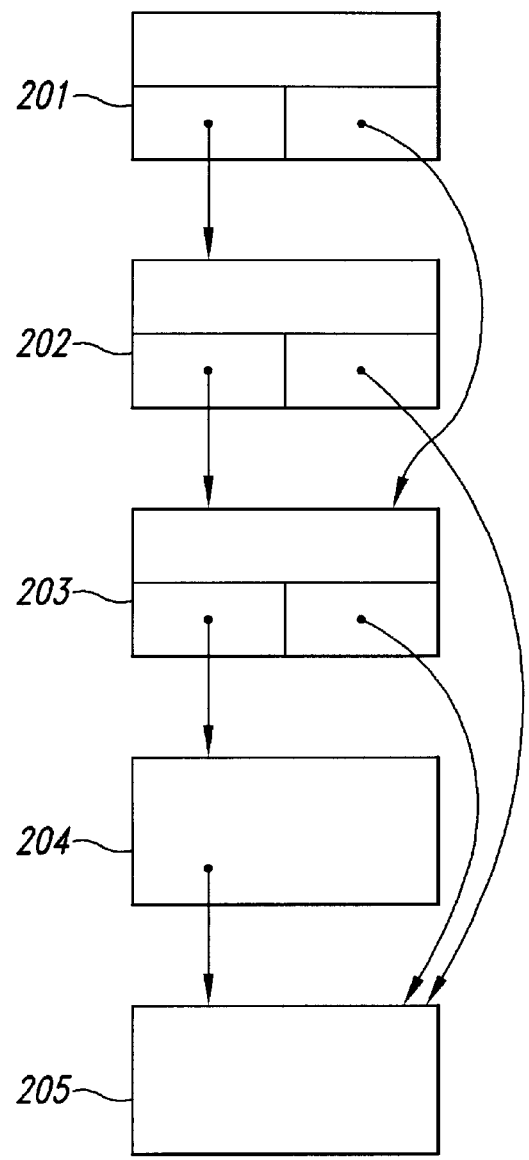
Fig. 1
Fig. 2

METHOD AND SYSTEM FOR TARGET REGISTER ALLOCATION

TECHNICAL FIELD

The present invention relates generally to target register allocation and, more specifically, to allocating and locating target registers for a computer program.

BACKGROUND OF THE INVENTION

Computers provide branch operations or instructions to control the flow of execution of a computer program. These branch operations can either be unconditional or conditional branches. An unconditional branch (e.g., a "goto" statement) indicates that the flow of control is to transfer to the location designated by the branch, rather than to the next location after the branch. A conditional branch (e.g., an "if" statement) indicates that the flow of control is to transfer to the location designated by the branch only if the condition specified in the branch is satisfied. If the condition is not satisfied, then the flow of control continues at the location after the branch. Some computers provide branch operations in which the transfer location for the branch ("target") is stored in a specified target register. For example, a computer may provide several target registers that can be specified by a branch operation as containing the address of the target. Prior to executing a branch, the target register specified by that branch needs to be loaded with the address of the target of the branch. This loading of the target register is referred to as "defining the target register."

A compiler may generate code that uses the branch operations to affect function invocation. When the compiler encounters a function invocation, the compiler generates code to load a "call" target register with the address of the function, code to load a "return" target register with the return address to which the function is to return, and code to branch to the address indicated in the call target register. The compiler uses the same target register every time as the return target register. In this way, functions that are separately compiled can be invoked and know where the return address is stored. In addition, compilers may generate code, assuming that certain target registers are to be preserved by the calls to functions. If a called function uses such a target register, then the called function needs to save the value of target register when invoked and restore the saved value of the target register before returning from the call. These target registers are referred to as "callee save registers." Each function could have its own set of registers as callee save registers. However, in general, a compiler may by convention assume that the set of callee save registers is the same for all functions.

A compiler may also use branch operations to implement "switch statements" and "indirect calls" of a programming language. When generating code for a switch statement, the compiler generates code to calculate at runtime the target within the switch statement. Once that target is calculated, the address of the target can then be loaded into the target register that is specified in the branch operation. When generating code for an indirect call, the compiler may generate code to load the target register with a variable that contains the address of the function to be called.

Computer programs can have very complex flow of control. Their flow of control is often represented by a control flow graph ("CFG") that indicates the paths of execution between the "basic blocks" of the computer program. A "basic block" is generally considered to be a series of one or more instructions having one and only one entrance instruction (i.e., where control enters the block), and one and only one exit instruction (i.e., where control exits the block). A "control flow graph" is a well-known structure for representing the flow of execution between basic blocks of a program. A control flow graph is a directed graph in which each node of the graph represents a basic block. A control flow graph has a directed edge from a block B1 to a block B2 if block B2 can immediately follow block B1 in some path of execution. In other words, a control flow graph has a directed edge from block B1 to block B2 (1) if the last instruction of block B1 includes a conditional or unconditional branch to the first instruction of block B2, or (2) if block B2 immediately follows block B1 in the order of the program and block B1 does not end in an instruction that includes an unconditional branch.

Because computer programs have complex flows of control, the selection of which target registers to assign to which branch operations can have a significant impact on the efficiency of such programs. For example, if the compiler generates code that specifies the same target register for each branch operation, then the compiler needs to generate code to re-load that target register before each branch operation. Such re-loading can seriously impact the efficiency of the program. It would be desirable to have a system that would allocate target registers to a computer program in a way that tended to improve the overall efficiency of the computer program.

SUMMARY OF THE INVENTION

Embodiments of the present invention provide a computer-based method and system for allocating target registers to branch operations and for determining the location of target definitions for the branch operations within a computer program. The target register allocation system of the present invention allocates a target register to be specified by each branch operation. The target register is to contain the address of the target that is loaded by the target definition. The target register allocation system determines a location in the computer program for a target definition such that whenever the branch operation is executed, the allocated target register contains the address of the target of the branch. The target allocation system may determine the location to be in a dominator block of the branch operation. The target allocation system may also determine the location of a target definition so that the address of the target that is loaded by the target definition can be used by multiple branch operations. The target allocation system may also determine the location of the target definition based on execution frequency of locations. The target allocation system may, when a branch operation is in a loop, determine the location of the target definition is to be outside the loop. The target allocation system may, when the program is a function, give preference to a non-callee save register in allocating a target register. The target allocation system may give preference to a callee save register of a function whose invocation is located in between the determined location and the location of the branch operation on a path of execution when allocating a target register. Conflicting preferences may be resolved based on execution frequencies.

BRIEF DESCRIPTION OF THE DRAWINGS

FIG. 1 illustrates the coalescing of live blocks into a single block and the extending of that single live range to include a dominator block.

FIG. 2 illustrates the coalescing of live blocks that is delayed until a dominator block is encountered.

DETAILED DESCRIPTION OF THE INVENTION

Figure 3:
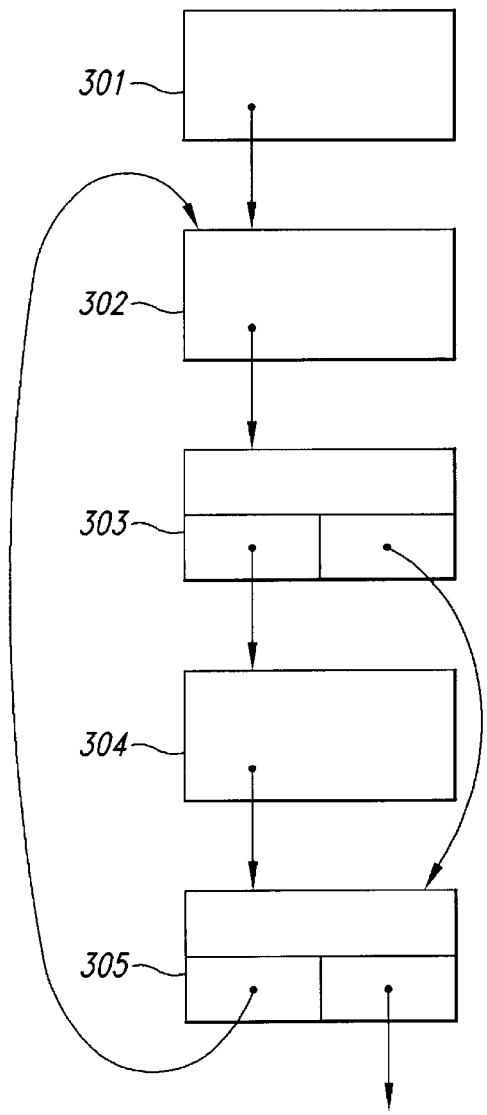
FIG. 3 illustrates the extending of a live range to encompass a loop.

Embodiments of the present invention provide a method and system for allocating target registers to a computer program. The target register allocation ("TRA") system of the present invention attempts to minimize the number of target register definitions (i.e., the loading of a target register) of the computer program, to place the target register definitions at a location early enough in the execution path that allows efficient prefetching of the target of a branch, to minimize the number of times target register definitions are executed, and to avoid the use of callee save registers of the function that is being allocated the target registers. The TRA system identifies branches that have the same target and attempts to locate a target definition so that it can be shared by both branches. If a branch is located within a loop, then the TRA system attempts to move the target definition outside the loop so that the target register is not re-loaded during each execution of the loop. When the TRA system encounters a call to a function, it tries to use the callee save registers of the called function so that the target definition of a branch that is after the call can be placed before the call. The TRA system can allocate such callee save registers knowing that their contents will not be changed by the called function.

The TRA system inputs a control flow graph with each block being ordered based on the position of the basic block in the computer program and having an execution frequency. The TRA system also inputs indications of the blocks that are the last blocks in a loop and blocks that are preheaders of loops. The TRA system processes the blocks in their reverse order, that is, starting with the last block in the computer program. When the TRA system encounters a block with a branch, it creates a "live range" for the target definition of the branch. A live range is a range of blocks that has a branch in its last block and that could still have the location of its target definition moved to a block that has not yet been encountered (i.e., earlier in the computer program). If the encountered block dominates a live range (i.e., the encountered lock is on every path of execution from the start of the computer program that includes the last block of the live range) with the same target, then the TRA system can locate the target definition for the branches of both live ranges in the encountered block. The TRA system coalesces the live ranges to create a single live range for both branches and locates the target definition for the live range in the encountered block. If, however, the newly created live range shares the same target as another live range, but the encountered block does not dominate the live range, then the TRA system cannot coalesce the live range because not all paths of execution through the other live ranges include the encountered block. Both these live ranges, however, may be dominated by blocks that have not yet been encountered. To keep track that these live ranges share the same target, the TRA system defines a "family" that contains both these live ranges. If eventually the TRA system encounters a block that dominates two live ranges in a family, the TRA system coalesces those two live ranges into a single live range and locates the target definition in the dominating block. In this way, the TRA system allows multiple branches to the same target to share the same target definition and locates the target definition early in the execution path of the branches.

FIGS. 1 and 2 illustrate the operation of the TRA system. FIG. 1 illustrates the coalescing of live blocks into a single block and the extending of that single live range to include a dominator block. As the TRA system encounters the blocks 101–105 in reverse order, the TRA system creates a live range when it encounters block 103 and another live range when it encounters block 102. Since block 102 dominates block 103 and the blocks share the same target (i.e., block 105), the TRA system coalesces the live ranges into a single live range that includes blocks 102 and 103 with the target definition for the branches located in block 102. When the TRA system encounters block 101, it notices that block 101 dominates the live range of blocks 102 and 103. Therefore, the TRA system extends the live range to include block 101 and the target definition for the branches of block 102 and 103 is located in block 101. The coalescing of live ranges allows target definitions to be shared and target definitions to be moved earlier in the execution path. The extending of a live range allows the target definition to be moved earlier in the execution path.

FIG. 2 illustrates the coalescing of live blocks that is delayed until a dominator block is encountered. The only difference between FIGS. 1 and 2 is that the second block does not dominate the third block. Thus, when the TRA system encounters block 202, it cannot coalesce the live ranges of block 202 and block 203. To keep track that these live ranges share the same target, the TRA system places these live ranges in the same family. When the TRA system encounters block 201, it notices that block 201 dominates both live ranges in the family. Therefore, the TRA system can use a single target definition that is located in block 201 for both live ranges. The TRA system coalesces the live ranges and extends the coalesced live range to include block 201.

The TRA system attempts to locate target definitions for branches occurring within a loop at the preheader block for the loop. The preheader block of a loop is a block that is immediately before a loop and dominates blocks in the loop. By locating the target definitions in the preheader, the target definitions are executed only once prior to executing the loop. The TRA system can place a target definition for a target register in the preheader when the last branch of a family of live ranges that use that target register in the loop and no other family that uses that target register has a target definition located in the loop. The TRA does so by extending the live range in the family to encompass the loop. If, however, there is such another family, then the TRA system tries to find another target register that can be used by the family to be extended. If the TRA system finds a suitable target register, then it assigns the suitable target register to the family and extends the live ranges of the family to encompass the entire loop so that the target definition can be located in the preheader block. The extending ensures that, if the TRA system eventually assigns the family to a different target register, any constraints on the assignment for the entire loop are considered.

FIG. 3 illustrates the extending of a live range to encompass a loop.

The loop comprises blocks 302–305, and block 301 is the preheader block of the loop. When the TRA system encounters block 305, it creates a live range for that block. When the TRA system encounters block 303, it creates another live range. Because the live range of block 305 has a different target register from the live range of block 303, the TRA system puts the live ranges in different families. When the TRA system encounters the preheader block 301, it extends the live range of block 303 to cover the entire loop. Since both live ranges encompass the entire loop, the TRA system can extend the live ranges to include the preheader block so that the target definitions for these live ranges can be located in the preheader block 301.

Figure 4:
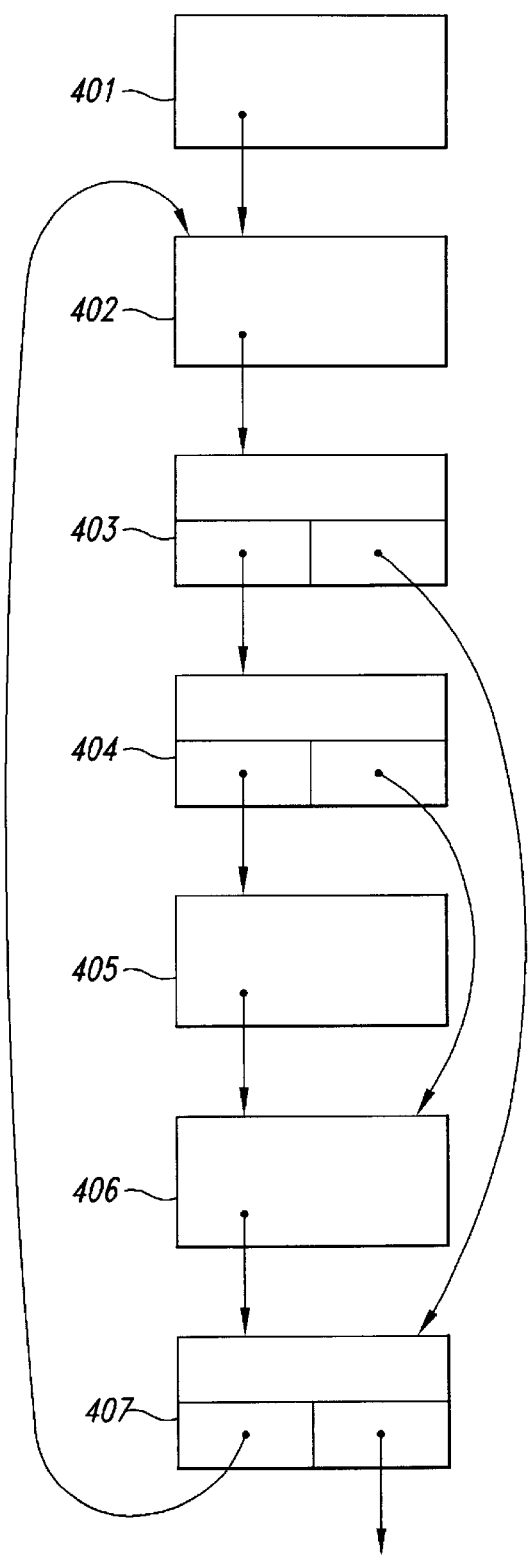
FIG. 4 illustrates a situation in which a live range cannot be extended to encompass the loop.

FIG. 4 illustrates a situation in which a live range cannot be extended to encompass the loop. The loop comprises blocks 402–407, and block 401 is the preheader block of the loop. The loop has three branches in blocks 403, 404, and 407 that have different targets. If the computer has only two target registers, then the live range associated with only one of the branches can include the entire loop. The target definition for the live range that encompasses the loop can be located in the preheader block 401. The other two branches need to share the other target register and have their target definitions placed in the body of the loop. When the TRA system encounters blocks 404 and blocks 407, it creates a live range for each in different families. When the TRA system encounters block 403 (and assuming the computer has only two target registers), it needs to select a target register for the live range to be created for block 403. Since both the target registers are already assigned to families, the TRA system sets one of the families to inactive, which means that the location of its target register definition is fixed at its current location. An active family of live ranges is one in which the TRA system is still attempting to find the final location of the target definition for the family. The TRA system then assigns the target register of the inactive family to the newly created live range for block 403. When the TRA system encounters the preheader block 401, it attempts to extend the family of the live range for block 403 to encompass the loop. However, since another family (i.e., that is now inactive) using the same target register has its target definition located in the loop, the attempt fails for the family of the live range of block 403. The TRA system will, however, extend the other live range that is currently active to encompass the loop and locate its target definition in the preheader block 401.

The TRA system allocates target registers for use in calling to and returning from functions. In one embodiment, any target register can be used to store the address for the function ("call register"), but only a predefined target register is used to store the return address ("return register"). The TRA system allocates two target registers when it encounters a call within a block and creates two live ranges. The TRA system also attempts to ensure that any family of live ranges that is active when a call is encountered is assigned to a callee save register of the function to be called. If any callee save register is not currently assigned to an active family, the TRA system attempts to assign that callee save register to an active family that is not using a callee save register of the function to be called. If the TRA system cannot assign a callee save register to all the active families (because not enough active families are available), then the TRA system sets those families to inactive, so that their target definition is located after the call. In this way, the TRA can extend live ranges across the call. The TRA system ensures that when a new target register is assigned to a family, that target register is a callee save register for each function called within a live range of the family. A loop may have multiple calls to functions that each have a different number of callee save registers. When the TRA system extends a live range to include a loop so that its target definition can be located in the preheader block of the loop, it ensures that the live range is assigned a target register that is a callee save register for each function that is called in the loop.

When the TRA system is allocating target registers for a function (e.g., portions of a computer program other than the main routine), it assigns target registers with a preference to non-callee save registers. If the TRA system can avoid allocating a non-callee save register to the function, then the program does not save and restore that non-callee save register. To help ensure that non-callee save registers are allocated when possible, the TRA system uses a repack algorithm when a live range is set to inactive to see if any live ranges can have their target register switch from a callee save register to a non-callee save register. In one embodiment, the TRA system assumes that the callee save registers are sequentially numbered from the lowest register number and that the higher numbered target registers are the non-callee save registers. Thus, the TRA system assigns higher numbered registers first and repacks by assigning higher numbered target registers to live ranges. If the actual callee save registers are not sequentially numbered from the lowest, then after the target allocation for the function is complete, the TRA system maps the assumed numbers of the callee save registers to the actual numbers of the callee save registers.

Figure 5:
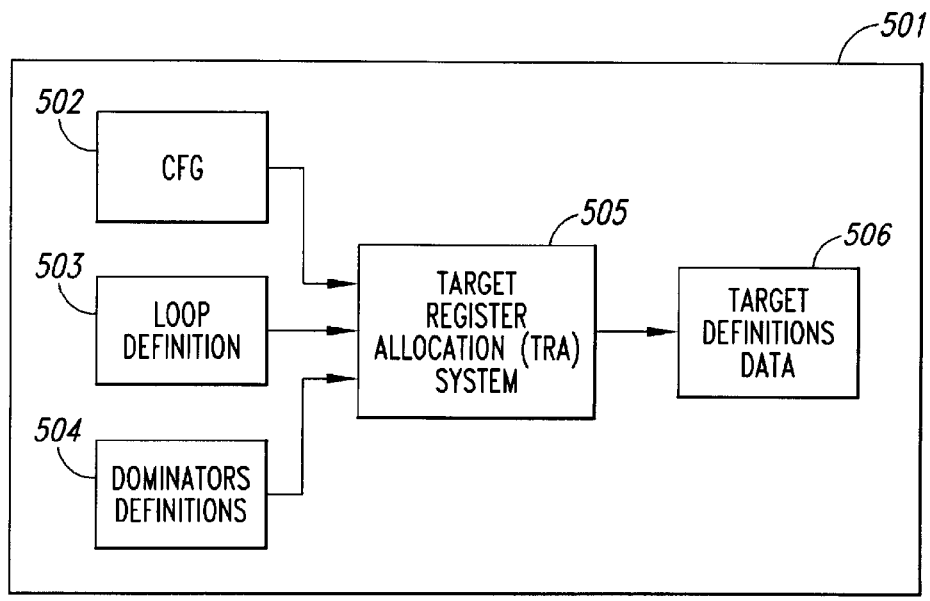
FIG. 5 is a block diagram illustrating the TRA system.

FIG. 5 is a block diagram illustrating the TRA system. The TRA system executes on a computer system 501 that includes a memory and a central processing unit. The computer program implementing the TRA system 505 is stored in memory of the computer system. The TRA system inputs a control flow graph ("CFG") 502 of a function that is to be allocated target registers. The CFG includes relative execution frequencies of each block in the CFG. The execution frequencies can be generated by monitoring previous executions of the function or estimated prior to executing the function. The TRA system also inputs loop definition data 503 of the loops of the CFG which identifies each block that is the last block in a loop and each block that is a preheader block of a loop. The TRA system also inputs dominator definition data 504 that identifies the immediate dominator of each block in the CFG. The TRA system generates and outputs the target definitions data 506 for the CFG, which includes each target definition along with its assigned target register location and each branch with its assigned target register.

Figure 6:
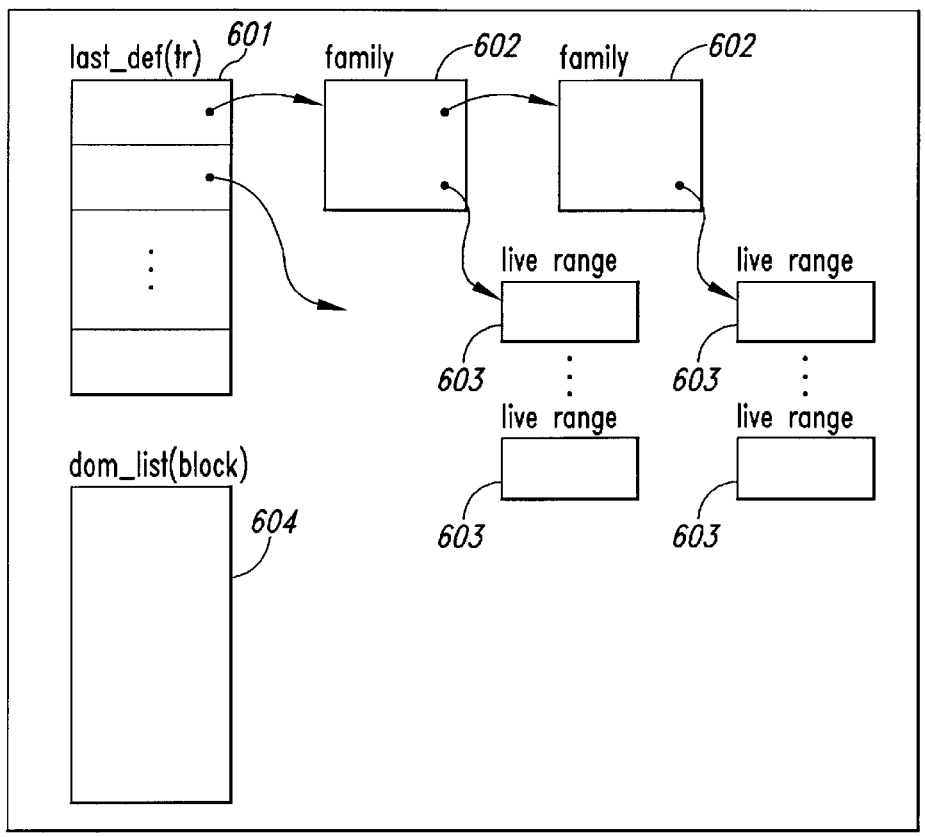
FIG. 6 is a block diagram illustrating data structures used by the TRA system in one embodiment.

FIG. 6 is a block diagram illustrating data structures used by the TRA system in one embodiment. The last defined ("last_def") array 601 contains an entry for each target register. Each entry points to a linked list of family data structures 602 representing families that are assigned to that target register. Each family data structure contains a list of live range data structures 603 representing the live ranges that are in that family. The family data structures are linked based on their order of creation, that is, the first family data structure represents the family most recently created. The TRA system also maintains a dominator list ("dom_list") array 604 that contains an entry for each block in the CFG. Each entry is used to keep track of live ranges that the block dominates. When the TRA system encounters a block, it extends the live ranges in the dominator list to include the encountered block. Tables 1 and 2 contain a description of the live range and family data structures. Tables 3 and 4 contain a description of other data structures, variables, and constants used by the TRA system.

TABLE 1

LIVE RANGES

| Field | Description |
|---|---|
| target definition ("d") | target definition for this live range |
| first_op | first operation in the range of operations that include all operations in "branches" |
| last_op | last operation in the range of operations that include all operations in "branches" |
| target | target block for this live range; a target can also be a called function, a function return point, or a computed location of a "switch" statement |
| branches | set of all branches in this live range that use the target register |
| family | pointer to the family that includes this live range |

TABLE 2

FAMILY

| Field | Description |
|---|---|
| next | pointer to the next family that is assigned to the same target register |
| ranges | list of pointers to the live ranges within this family |
| target | target block for this family of live ranges |
| target register ("tr") | target register assigned to this family |

TABLE 2-continued

FAMILY

| Field | Description |
|---|---|
| cost | sum of execution frequencies of all blocks which contain target definitions for the live ranges in this family |
| limit | target register for this family must be less than or equal to this value because of the callee save registers of functions called within the live ranges of the family |
| physical | indicates that this family can only use target register tr (e.g., a live range for the return of a call is bound to the return register) |
| avail | indicates earliest location where the target definition may be placed for computed branches; computed branches include jump tables and indirect calls; a target definition cannot be placed before the operation that sets the index for the indirect call or that sets the address variable for an indirect call |
| last(f) | computed value that is the largest value of a last field for all live ranges in family ("f") |
| first(f) | computed value that is the smallest value of a last field for all live ranges in family ("f") |

TABLE 3

VARIABLE DESCRIPTIONS

| Name | Descriptions |
|---|---|
| loc(x) | number assigned to operation "x" based on the ordering of the blocks and operations within the blocks |
| block_last_op (block) | number assigned to last operation in the block |
| dom(block) | the ordered immediate dominator of the block; the ordered immediate dominator is the highest numbered block (with a number smaller than the block) such that all paths of execution from the start block through the block include the dominator |
| freq(b) | execution frequency of block "b" or of the block that contains operation "b" |
| dom_list(block) | set of live ranges such that that the block is the dominator of the blocks currently containing the target definitions of the live ranges |
| loop_depth | current depth of a loop |
| call_limit (loop_depth) | minimum callee save register of all functions called in the loop at loop depth |
| loop_last_op (loop_depth) | last operation in the loop at that loop depth |

TABLE 4

CONSTANTS

| Name | Description |
|---|---|
| MAX_LIVE | numbers of available target registers, numbered 1 . . . MAX_LIVE |
| NUM-CALLEE_SAVE | Number of callee save registers, numbered 1 . . . NUM_CALLEE_SAVE |

Figure 7:
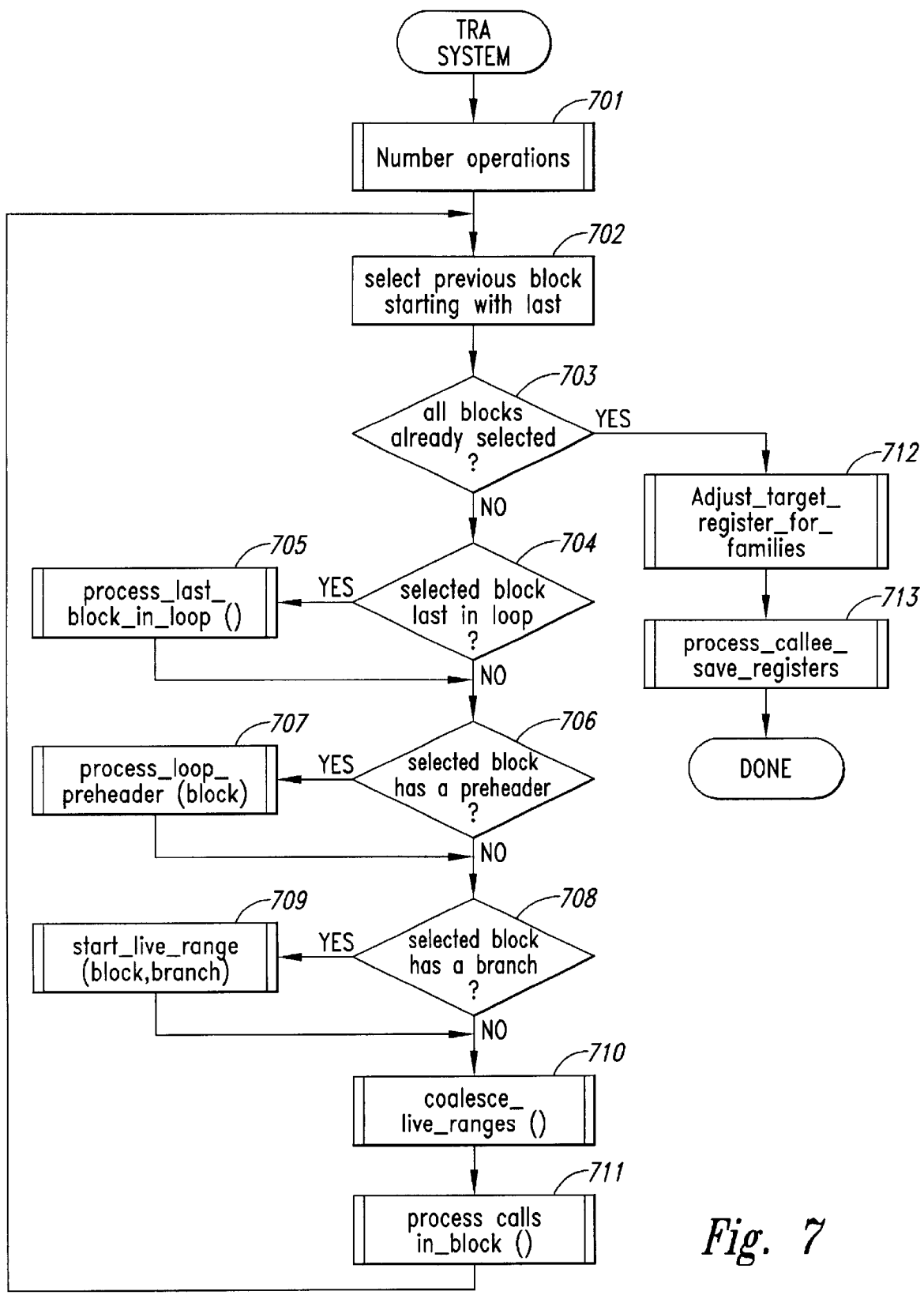
FIG. 7 is a flow diagram of an example routine that implements the TRA system.

FIG. 7 is a flow diagram of an example routine that implements the TRA system. This routine first numbers each block in the function that is to be allocated target registers. The routine then loops selecting each block in reverse order and establishing the location and target register for the target definition for each branch. Finally, the routine updates the target definitions and adds operations to save and restore any callee save register used by the function. In step 701, the routine invokes the number_operations routine, which numbers the operations in each block. In steps 702–711, the routine loops selecting and processing each block starting with the last block. In step 702, the routine selects the next previous block starting with the last block. In step 703, if all the blocks have already been selected, then the routine continues at step 712, else the routine continues at step 704. In step 704, if the selected block is the last block in a loop, then the routine continues at step 705, else the routine continues at step 706. In step 705, the routine invokes the process_last_block_in_loop routine, which initializes a value for the loop that indicates the callee save register of the functions that are called in the loop. In step 706, if the selected block is a loop preheader, then the routine continues at step 707, else the routine continues at step 708. In step 707, the routine invokes the process_loop_preheader routine, which extends live ranges, as appropriate, to encompass the loop so that the target definition can be placed in the preheader block. In step 708, if the selected block has a branch operation, then the routine continues at step 709, else the routine continues at step 710. In step 709, the routine invokes the start_live_range routine passing the selected block and the branch. The start_live_range routine creates a live range and adds it to a family of live ranges that have the same target and can possibly share the same target definition. In step 710, the routine invokes the coalesce_live_ranges routine, which coalesces the live ranges in the same family that are dominated by the selected block. In step 711, the routine invokes the process_calls_in_block routine and loops to step 702 to select the next previous block. The process_calls_in_block routine creates a live range for the return register and the call register for each call to a function in the selected block. Steps 712–713 are performed after all the blocks have been processed. In step 712, the routine invokes the adjust_target_register_for_families routine, which sets the target registers of the target definitions and branches. In step 713, the routine invokes the process_callee_save_registers routine to add save and restore operations for the callee save registers of the function, as appropriate, and then completes.

Figure 8:
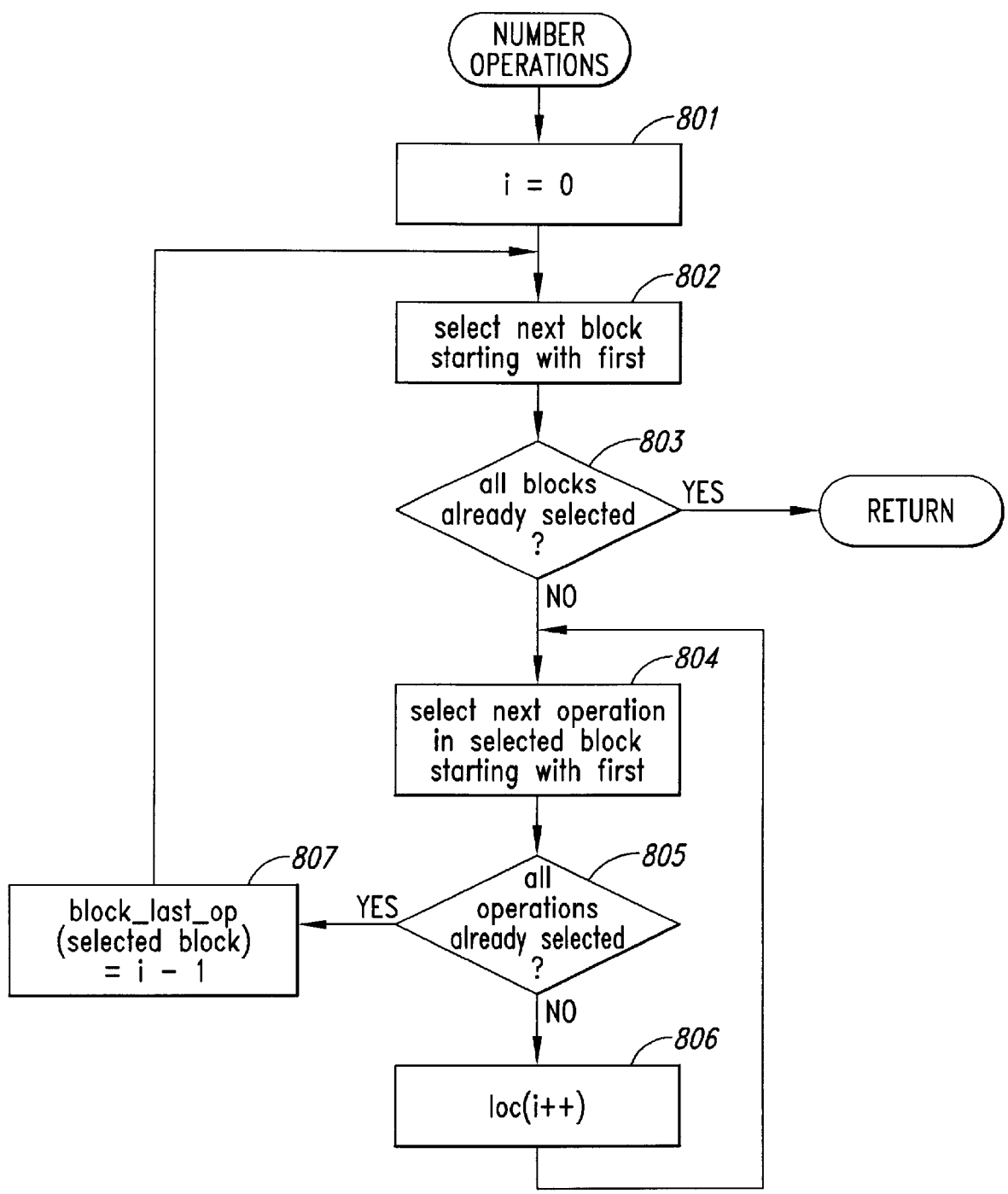
FIG. 8 is a flow diagram of an example implementation of a number_operations routine.

FIG. 8 is a flow diagram of an example implementation of a number_operations routine. This routine assigns a sequential number to each operation within each block and records the sequential number assigned to the last operation in each block. This routine loops selecting each block and each operation within each block. In step 811, the routine sets the index i, which represents the sequential number, is equal to zero. In step 812, the routine selects the next block starting with the first block. In step 813, if all the blocks have already been selected, then the routine returns, else the routine continues at step 814. In step 814, the routine selects the next operation in the selected block starting with the first. In step 815, if all the operations have already been selected, then the routine continues at step 817, else the routine continues at step 816. In step 816, the routine sets the sequential number ("loc") of the selected operation to the index i, increments the index i, and loops to step 814 to select the next operation. In step 817, the routine sets the last operation ("block_last_op") within the selected block equal to the index i minus 1 to record the number of the last operation in the block and loops to step 814.

Figure 9:
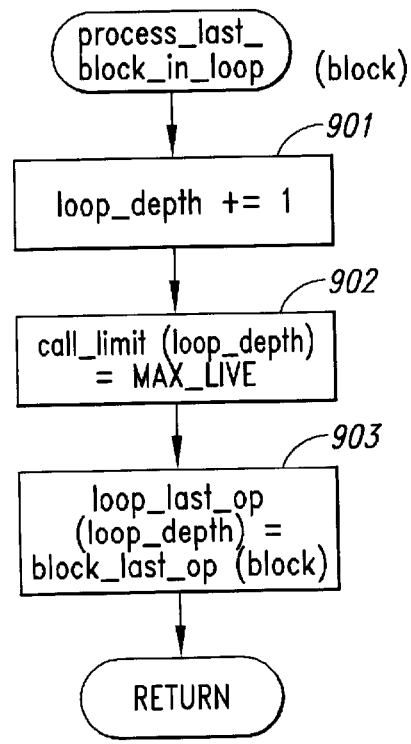
FIG. 9 is a flow diagram of an example implementation of a process_last_block_in_loop routine.

FIG. 9 is a flow diagram of an example implementation of a process_last_block_in_loop routine. This routine is invoked whenever the last block in a loop is encountered. This routine initializes the call limit (i.e., minimum number of callee save register used by a function that is called in the loop) for the loop depth of the passed block and records the number of the last operation in the passed block so that a live range can be extended to that last block in the loop. In step 901, the routine increments the loop depth ("loop_depth"). In step 902, the routine sets the call limit for this loop depth ("call_limit(loop_depth)") equal to the available number of target registers ("MAX_LIVE") since no calls to functions within the loop have been encountered yet. In step 903, the routine records the number of the last operation in this loop ("loop_last_op(loop_depth)") as the last operation in the passed block ("block_last_op (block)") and then returns.

Figure 10:
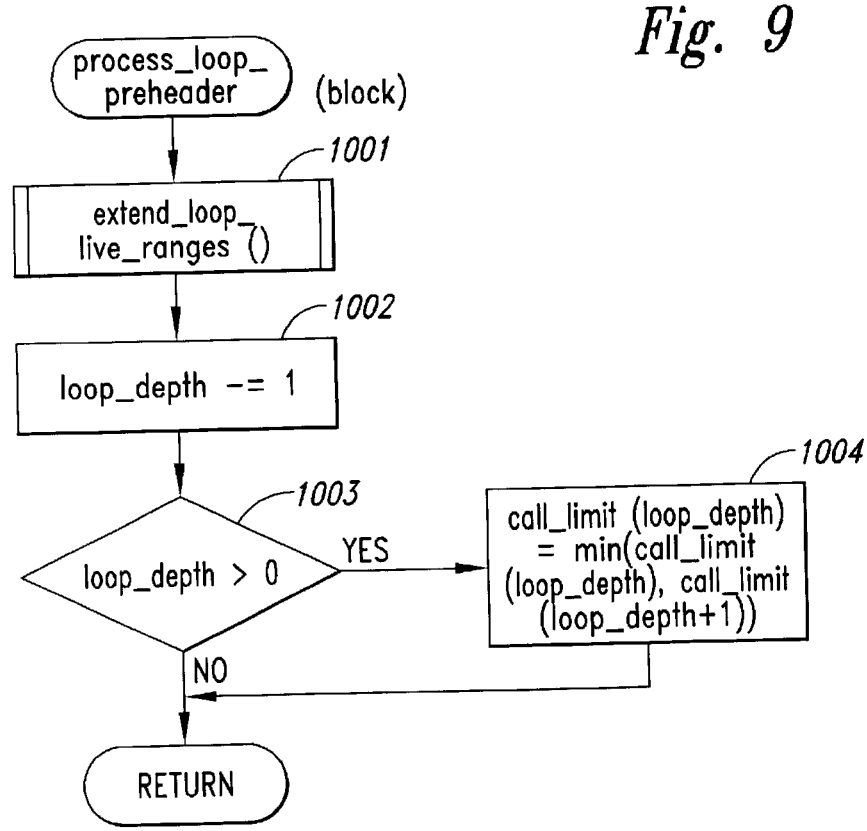
FIG. 10 is a flow diagram of an example implementation of a process_loop_preheader routine.

FIG. 10 is a flow diagram of an example implementation of a process_loop_preheader routine. This routine extends any live ranges that can encompass the loop. This routine is passed the block that is the preheader of a loop. In step 1001, the routine invokes the extend_loop_live_ranges routine to extend any live ranges. In step 1002, the routine decrements the loop depth ("loop_depth") because a loop is being exited. In step 1003, if the preheader is within an outer loop ("loop_depth>0"), then the routine continues at step 1004, else the routine returns. In step 1004, the routine adjusts the call limit for the outer loop ("call_limit(loop_depth)") to the minimum of the call limit of the outer loop depth and of the call limit of the inner loop ("call_limit(loop_depth+1)") whose preheader was just processed. This adjustment is made so that the minimum number of callee save registers for the inner loop is reflected in the outer loop. The routine then returns.

Figure 11:
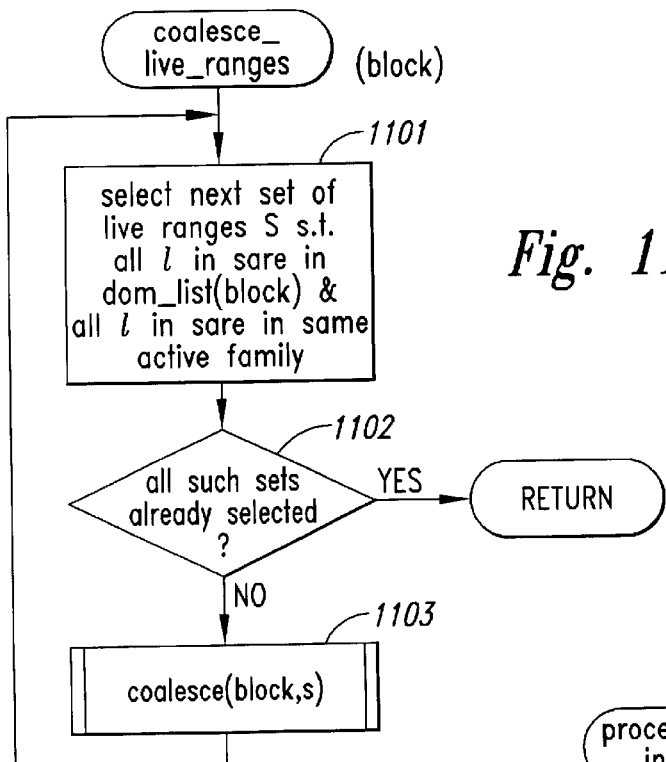
FIG. 11 is a flow diagram of an example implementation of the coalesce_live_ranges routine.

FIG. 11 is a flow diagram of an example implementation of the coalesce_live_ranges routine. This routine coalesces the live ranges for each active family that is dominated by the passed block. The coalescing represents those live ranges by a single live range with its target definition in the passed block. In step 1101, the routine selects the next set of live ranges ("s") such that all of the live ranges ("l") in the set are in the dominator list ("dom_list") for the passed block and all the live ranges in the set are in the same active family. In step 1102, if all such sets have already been selected, then the routine returns, else the routine continues at step 1103. In step 1103, the routine invokes the coalesce routine passing the passed block and the selected set to coalesce the live ranges in the selected set into a single live range. The routine then loops to step 1101 to select the next set.

Figure 12:
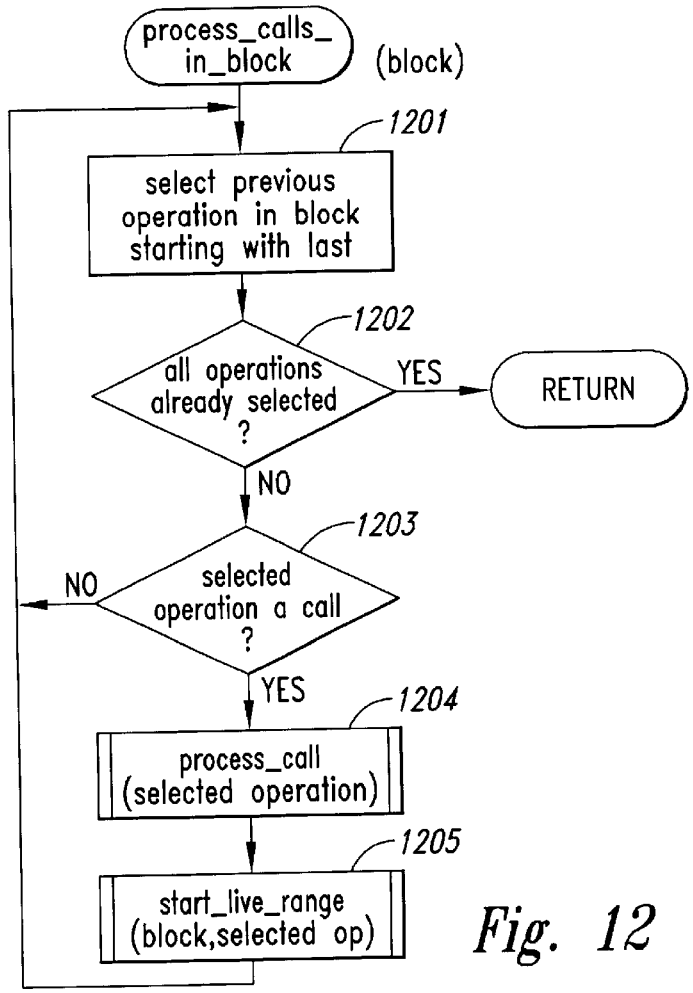
FIG. 12 is a flow diagram of an example implementation of a process_calls_in_block routine.

FIG. 12 is a flow diagram of an example implementation of a process_calls_in_block routine. This routine creates a live range for the return register and the call register for each call to a function in the passed block. This routine attempts to assign active families to callee save registers of the called function so that their contents survive the call. In step 1201, the routine selects the previous operation in the passed block starting with the last operation. In step 1202, if all the operations in the passed block have already been selected, then the routine returns, else the routine continues at step 1203. In step 1203, if the selected operation is a call, then the routine continues at step 1204, else the routine loops to step 1201 to select the next previous operation. In step 1204, the routine invokes the process_call routine passing the selected operation to create a live range for the return register. In step 1205, the routine invokes the start_live_range routine passing the block and the selected operation to create a live range for the call register. The routine then loops to step 1201 to select the next previous operation.

Figure 13:
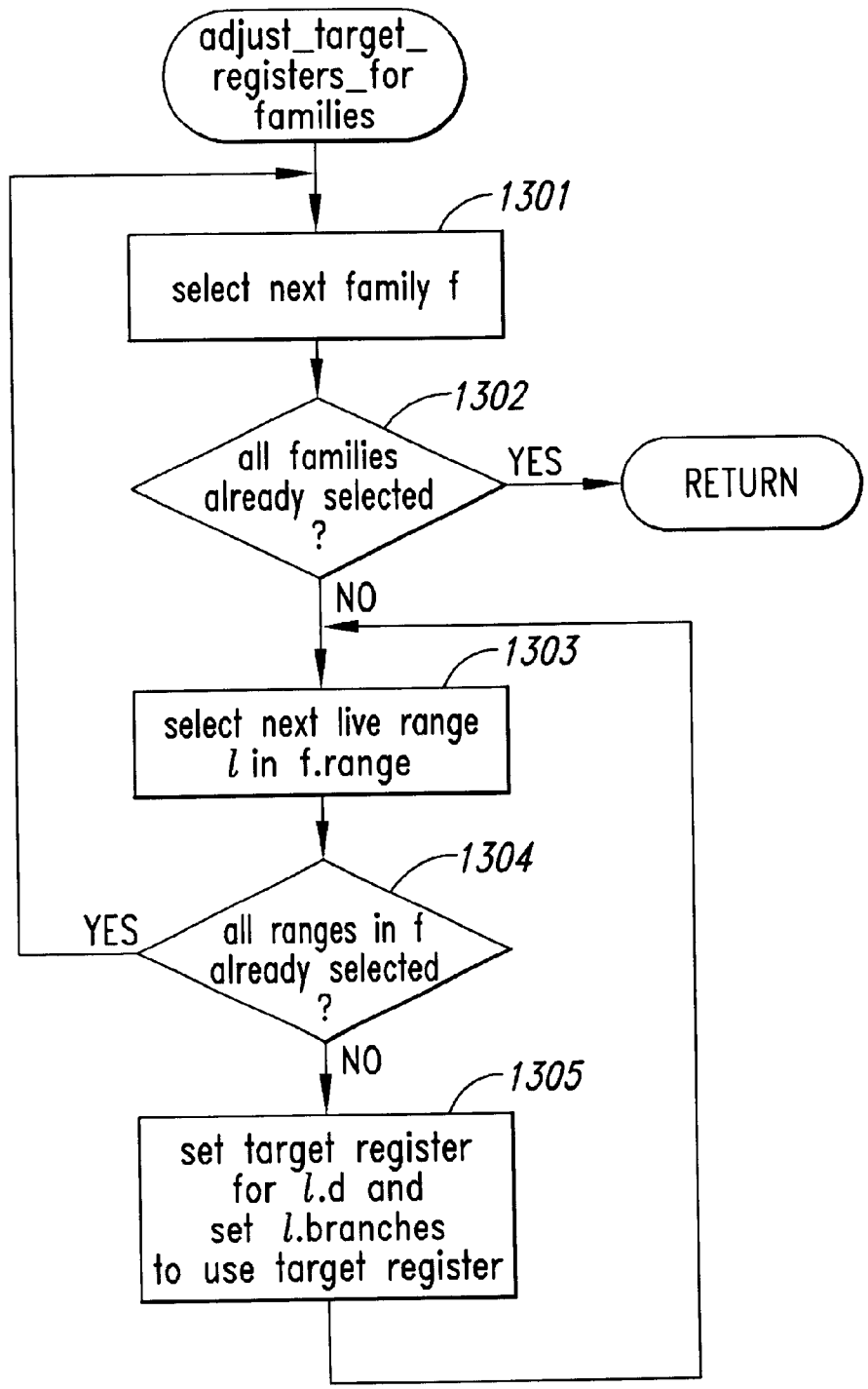
FIG. 13 is a flow diagram of an example implementation of a adjust_target_registers_for_families routine.

FIG. 13 is a flow diagram of an example implementation of a adjust_target_registers_for_families routine. After all the blocks have been processed, this routine sets the target register for each target definition and for each branch in all the families. In step 1301, the routine selects the next family ("f"). In step 1302, if all the families have already been selected, then the routine returns, else the routine continues at step 1303. In step 1303, the routine selects the next live range ("l") of the selected family ("f.range"). In step 1304, if all the live ranges have already been selected, then the routine loops to step 1301 to select the next family, else the routine continues at step 1305. In step 1305, the routine sets the target register for the target definition of the selected live range ("l.d") and sets the branch instructions for the selected live range ("l.branches") to use the target register of the selected family ("f.tr"). The routine then loops to step 1303 to select the next live range in a family. In one embodiment, the callee save registers may not be the lowest number target register. If not, this routine maps the calculated target register to the actual target register.

Figure 14:
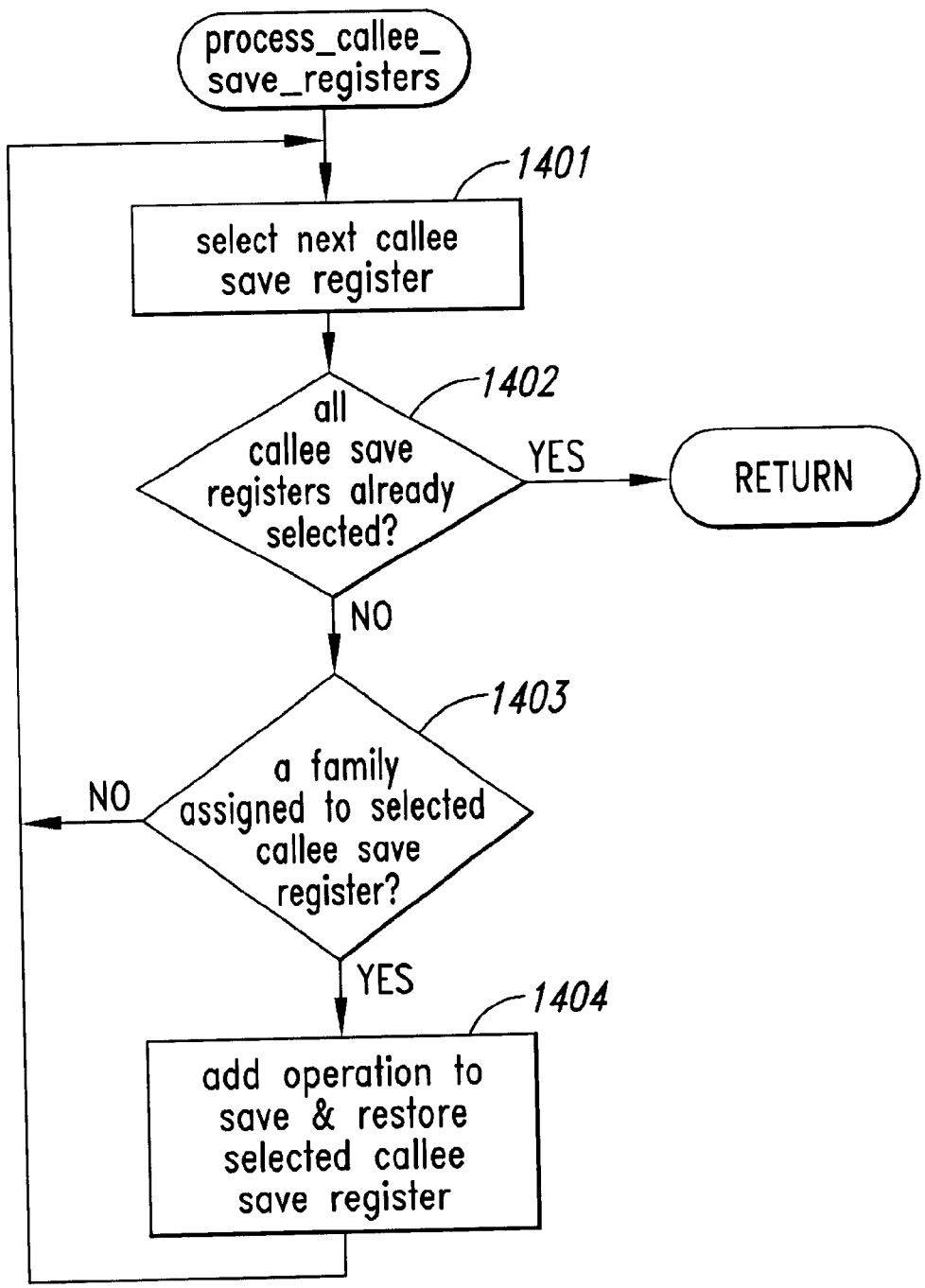
FIG. 14 is a flow diagram of an example implementation of a process_callee_save_registers routine.

FIG. 14 is a flow diagram of an example implementation of a process_callee_save_registers routine. This routine inserts operations to save and restore the callee save registers that a family uses so that the function that is having its target registers allocated will adhere to the callee save register convention. In step 1401, the routine selects the next callee save register. In step 1402, if all the callee save registers have already been selected, then the routine returns, else the routine continues at step 1403. In step 1403, if a family is assigned to the selected callee save register, then the routine continues at step 1404, else the routine loops to step 1402 to select the next callee save register. In step 1404, the routine adds operations to save and restore the selected callee save register and loops to step 1402 to select the next callee save register.

Figure 15:
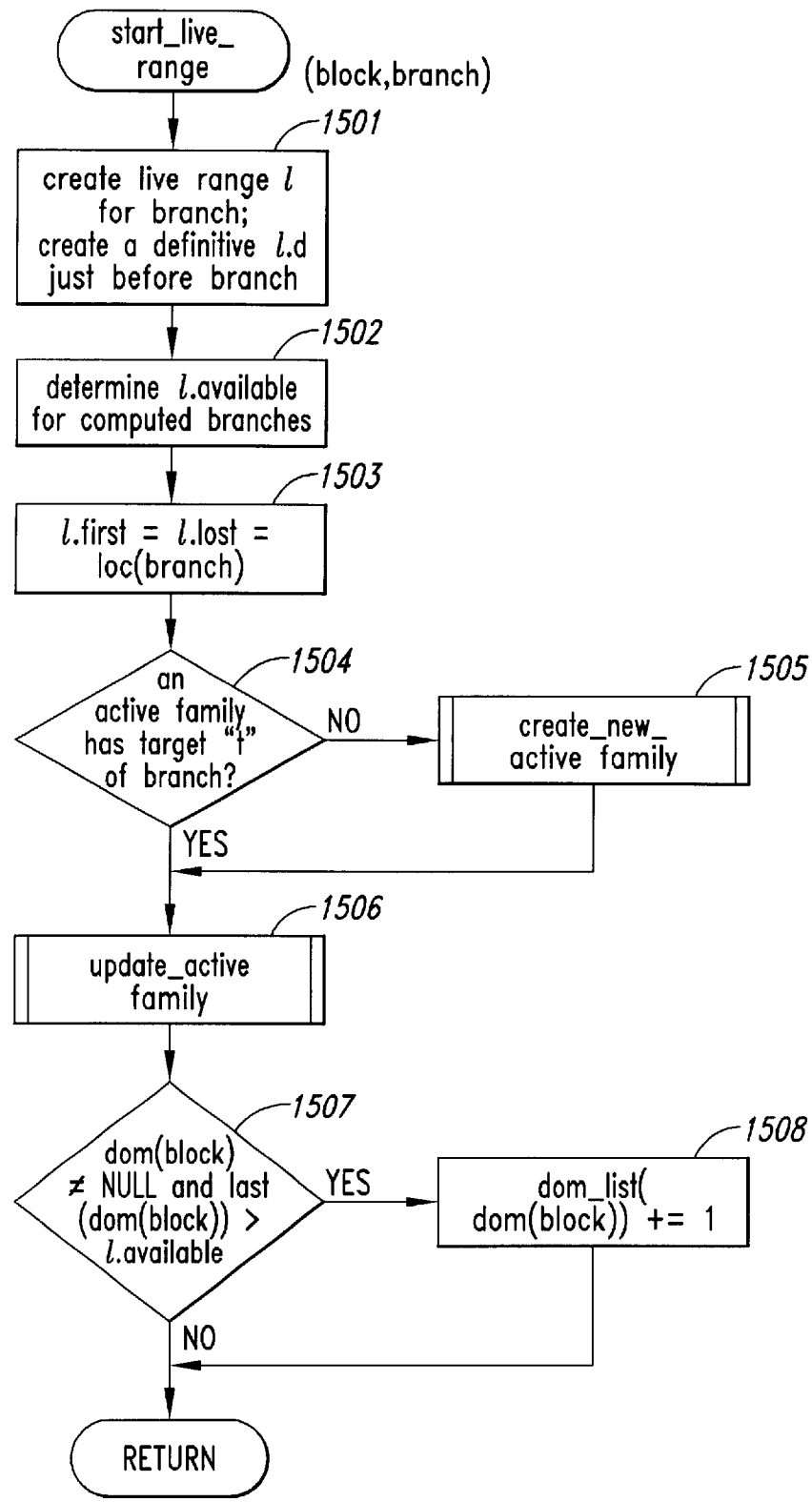
FIG. 15 is a flow diagram of example implementation of a start_live_range routine.

FIG. 15 is a flow diagram of example implementation of a start_live_range routine. This routine is passed an indication of a block and of a branch. This routine creates a live range for the passed block and branch. The routine sets the initial location of a target definition for the branch within the passed block, initializes the bounds of the live range to the location of the branch, and adds the live range either to an active family with the same target or, if none exists, to a newly created family. In step 1501, the routine creates a live range ("l") for the passed branch and creates a target definition ("l.d"). In step 1502, if the branch is a computed branch, the routine determines a computed branch location ("avail") before which the target definition cannot be placed. In step 1503, the routine sets the first ("l.first") and the last ("l.last") operation in the live range equal to the location of the passed branch operation ("loc(branch)"). The target definition is located in the block that contains the first operation. In step 1504, if an active family has a target that is the same as the passed branch, then the newly created live range can be added to that active family and the routine continues at step 1506, else a new active family is needed and the routine continues at step 1505. In step 1505, the routine invokes the create_new_active_family routine. In step 1506, the routine invokes the update_active_family routine to add the newly created live range to the active family. In step 1507, if the passed block has a dominator ("dom(block)!=NULL") and the dominator is after the computed branch location ("block_last_op(dom(block) >avail"), if any, then the routine continues at step 1508, else the routine returns. In step 1508, the routine adds the live range ("l") to the dominator list of the dominator block ("dom_list(dom(block))"), so that when that dominator block is encountered, the live range can be extended to include the dominator block, and the routine then returns.

Figure 16:
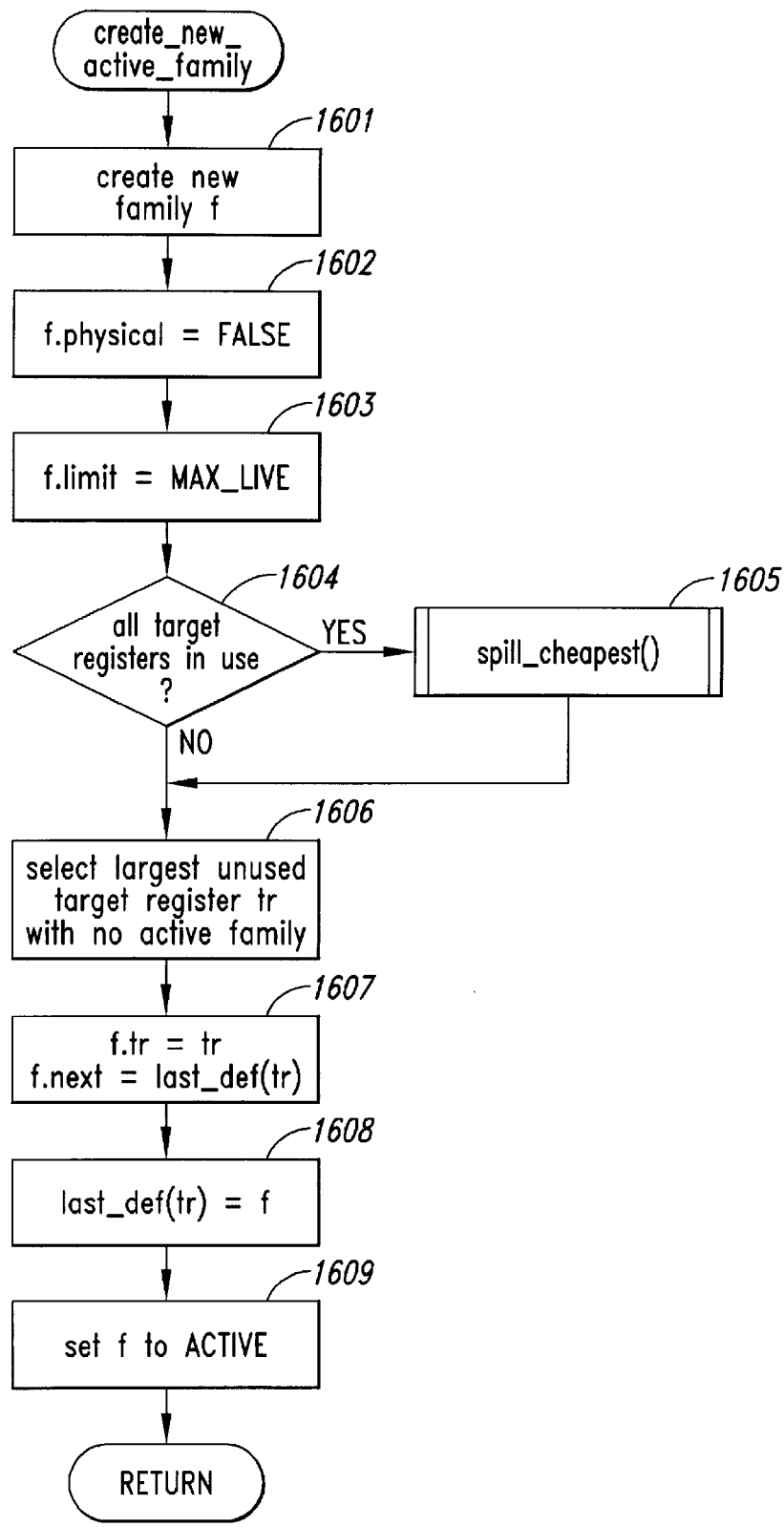
FIG. 16 is a flow diagram of an example implementation of a create_new_active_family routine.

FIG. 16 is a flow diagram of an example implementation of a create_new_active_family routine. This routine creates a new active family and assigns a target register to it. The routine sets a family to inactive if all target registers are in use, so that one target register is available to be assigned to the newly created active family. In step 1601, the routine creates a new family ("f"). In step 1602, the routine indicates that this family is not bound to a certain target register ("f.physical"). In step 1603, the routine sets the limit for this new family ("f.limit") equal to the largest available target register ("MAX_LIVE"), which means that any target register can be assigned to this family. The limit is adjusted based on the callee save register of functions called within the live range. In step 1604, if all the target registers are in use by active families, then the routine continues at step 1605, else the routine continues at step 1606. In step 1605, the routine invokes the spill_cheapest routine to ensure that one target register is not in use by an active family. In step 1606, the routine selects the largest numbered target register ("tr") that is not assigned to an active family. The selection of the largest numbered target register results in non-callee save registers being assigned before callee save registers. In step 1607, the routine sets the target register for the new family ("f.tr") to the selected target register ("tr") and sets the pointer to the next active family ("f.next") to point to the family to which the selected target register was last assigned ("last_def(tr)"). In step 1608, the routine sets the last family defined for the selected target register ("last_def(tr)") to the newly created family. In step 1609, the routine sets the new family to active and returns.

Figure 17:
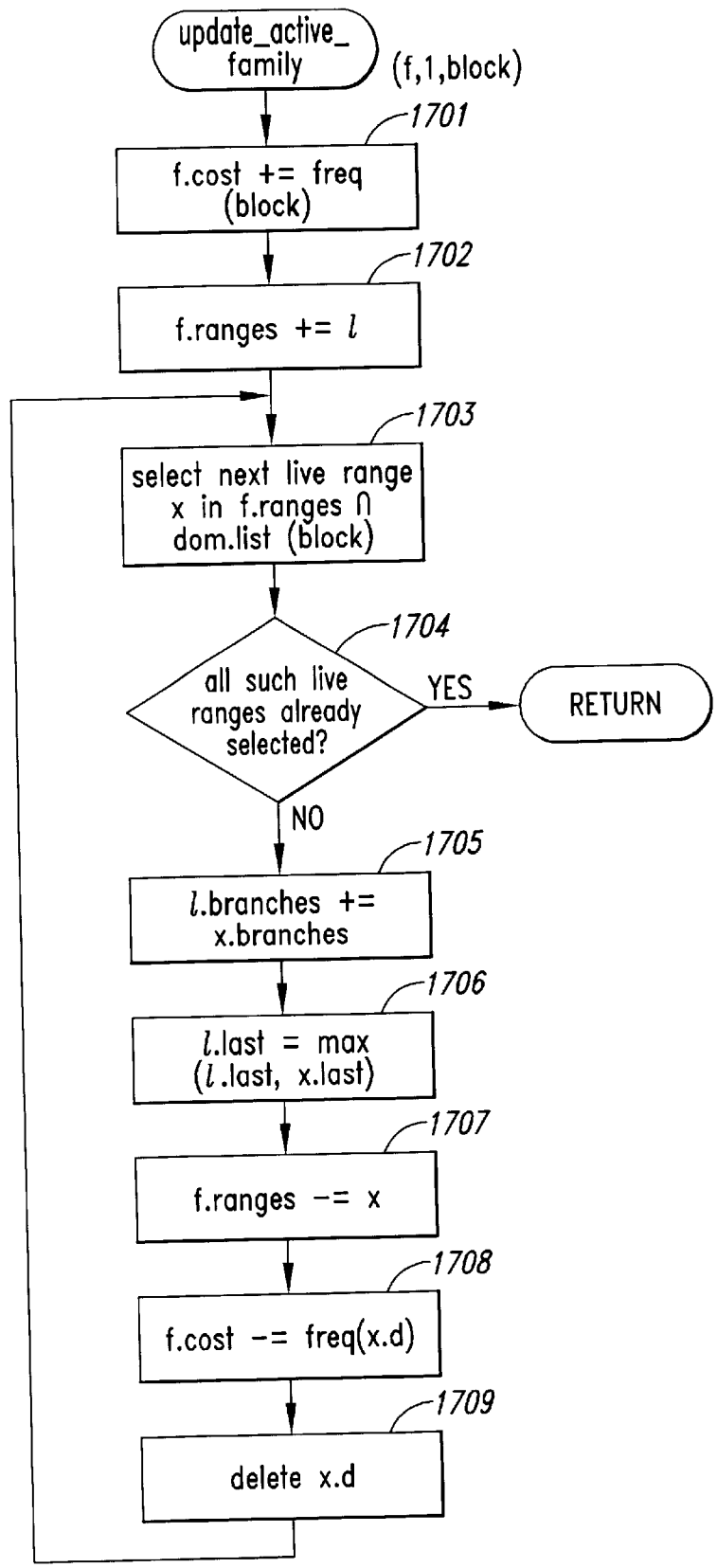
FIG. 17 is a flow diagram of an example implementation of the update_active_family routine.

FIG. 17 is a flow diagram of an example implementation of the update_active_family routine. This routine is passed a family ("f"), a live range ("l"), and a block in which the live range ends. This routine adds the passed live range to the active family. The routine coalesces any live ranges in the active family that are dominated by the passed block because they can all share the same target definition that is placed in the passed block. In step 1701, the routine increases the cost of the family ("f.cost") by the frequency of the passed block ("freq (block)"). In step 1702, the routine adds the created live range ("l") to the family ("f.ranges"). In steps 1703–1709, the routine coalesces all live ranges in the passed family that are dominated by the passed block. In step 1703, the routine selects a next live range in the family that is also in the dominator list for the passed block ("dom_list(block)"). In step 1704, if all such live ranges have already been selected, then the routine returns, else the routine continues at step 1705. In step 1705, the routine adds the branches of the selected live range ("x.branches") to the set of branches of the passed live range ("l.branches"). In step 1706, the routine sets the last operation of the passed live range ("l.last") to the greater of the last operation of the passed live range and the last operation of the selected live range. In step 1707, the routine removes the selected live range from the family. In step 1708, the routine decrements the cost of the family ("f.cost") based on the execution frequency of the block that contained the target definition of selected live range ("freq(x.d)"). In step 1709, the routine deletes the definition for the selected live range ("x.d") and loops to step 1703 to select the next live range.

Figure 18:
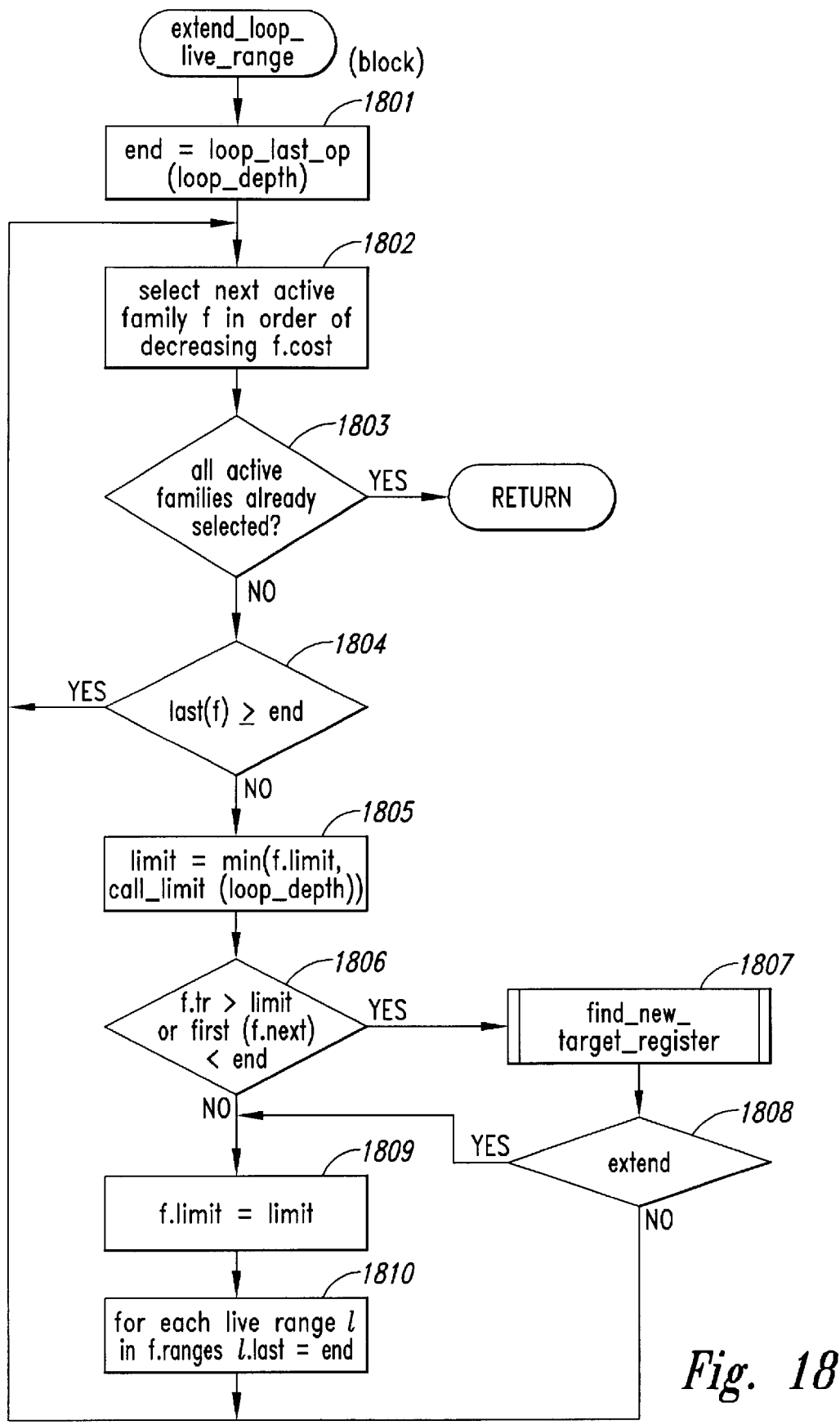
FIG. 18 is a flow diagram of an example implementation of the extend_loop_live_range routine.

FIG. 18 is a flow diagram of an example implementation of the extend_loop_live_range routine. This routine extends, as appropriate, the live ranges of those active families whose last operation is within the loop. If the target register for the family is not a callee save register for each function called in the loop or the next family that uses that target register starts in the loop, then the routine tries to find another target register that is such a register. Otherwise, the routine extends the family to encompass the loop. If the routine can find no such other target register, then the routine sets a family to inactive and repacks the registers. If, however, such a target register can be found, then the routine assigns that found target register to the family and extends the family to encompass the loop. In step 1801, the routine sets the end of the loop ("end") to the last operation at that loop depth ("loop_last_op(loop_depth)"). In step 1802, the routine selects the next active family ("f") in order of decreasing cost ("f.cost"). In step 1803, if all the active families have already been selected, then the routine returns, else the routine continues at step 1804. In step 1804, if the last operation in the selected family is not within the loop ("last(f)≧end"), then the live range already includes the loop and the routine loops to step 1802 to select the next active family, else the routine continues step 1805. In step 1805, the routine calculates the limit for the target registers ("limit") for the selected family as the minimum of the limit for the family ("f.limit") and the call limit of this loop ("call_limit(loop_depth)"). In step 1806, the routine determines whether the target register for the selected family needs to be changed. The target register needs to be changed if the target register is greater than the calculated limit or if the next live range in the family extends into the loop. In step 1806, if the target register for the selected family ("f.tr") is greater than the calculated limit or the first operation of the next family ("first (f.next)") and is less than the last operation in the loop ("end"), then routine continues at step 1807, else the routine continues at step 1809. In step 1807, the routine invokes the find_new_target_register routine. In step 1808, if the invoked routine indicates to extend the range, then the routine continues at step 1809, else the routine loops to step 1802 to select the next active family. In steps 1809–1810, the routine extends the live ranges in the selected family to encompass the loop. In step 1809, the routine sets the limit for the family ("f.limit") to be the calculated limit. In step 1810, for each live range of the selected family ("f.ranges"), the routine sets the last operation of the live range ("l.last") equal to the last operation in the loop ("end") and loops to step 1802 to select the next active family.

Figure 19:
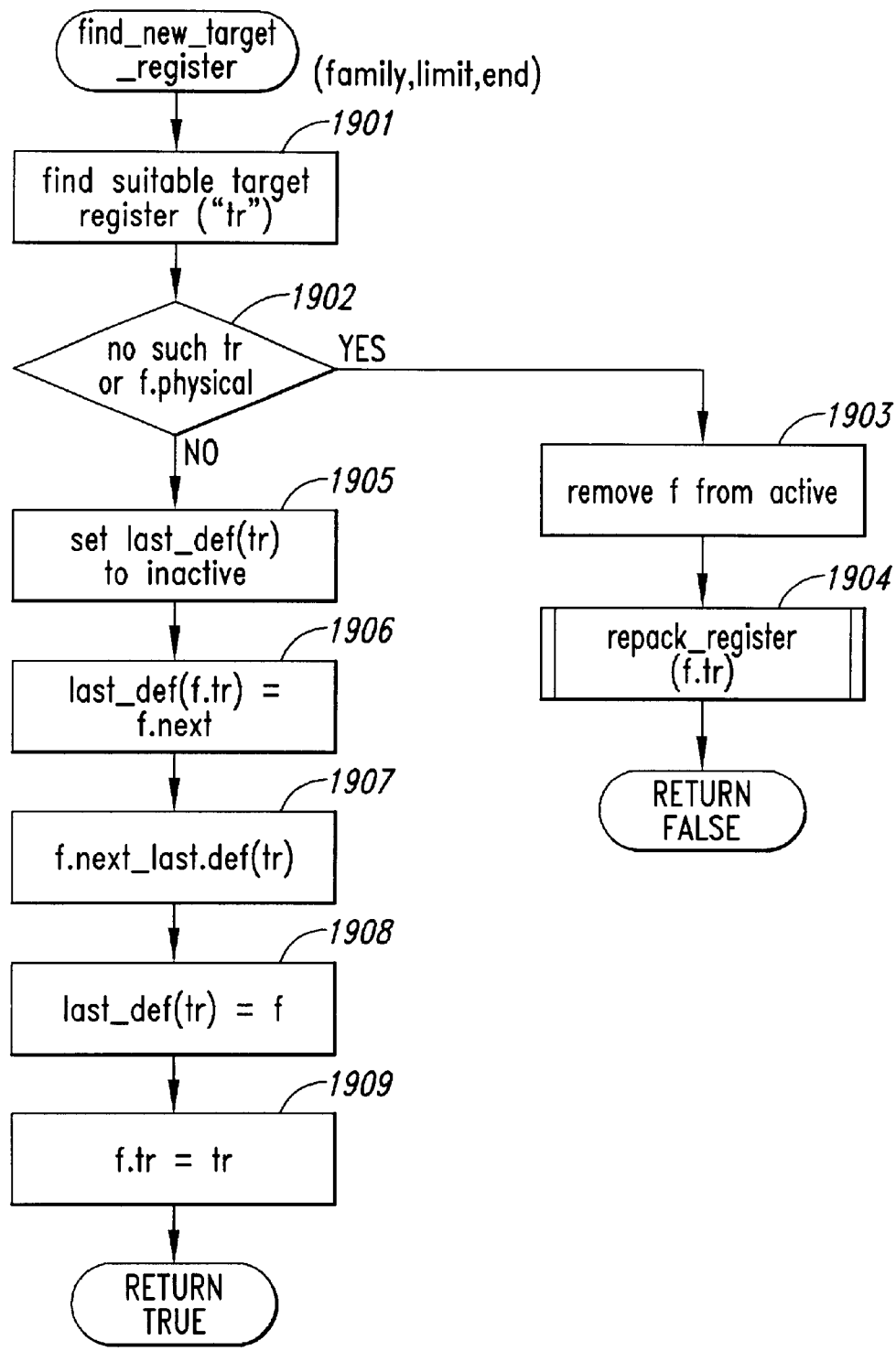
FIG. 19 is a flow diagram of an example implementation of the find_new_target_register routine.

FIG. 19 is a flow diagram of an example implementation of the find_new_target_register routine. This routine is passed a family, a limit for the target registers, and the end of the loop. The routine finds a suitable target register for the family, if possible. In step 1901, the routine looks for a suitable target register ("tr"). A target register is suitable if it is a callee save register for each called function in the live ranges of the family ("tr<=limit") and either the target register has not yet been assigned to an active family ("last_def(tr)==NULL") or is defined outside the loop ("first (last_def(tr))>end") and that family is not active or that family has the least cost. In step 1902, if no suitable target register exists or if the passed family is bound to a specific target register ("f.physical==TRUE"), then the routine continues at step 1903, else the routine continues at step 1905. In step 1903, the routine sets the passed family to inactive because no available target register is suitable, In step 1904, the routine invokes the repack register routine passing an indication of the target register of the passed family ("f.tr)" and returns a flag indicating that the passed family is not to be extended. In steps 1905–1909, the routine switches the passed family to the found target register. In step 1905, the routine sets the family, if any, that was last assigned to the found target register to inactive. In step 1906, the routine unassigns the passed family from its currently assigned target register ("last_def(f.tr)=f-next"). In step 1907, the routine sets the passed family to point to the family last assigned to the found target register ("f.next=last_def (tr)"). In step 1908, the routine links the passed family onto the list of families for the found target register ("last_def (tr)=f"). In step 1909, the routine sets the target register of the passed family to the found target register ("f.tr=tr") and returns with a flag indicating that the passed family is to be extended.

Figure 20:
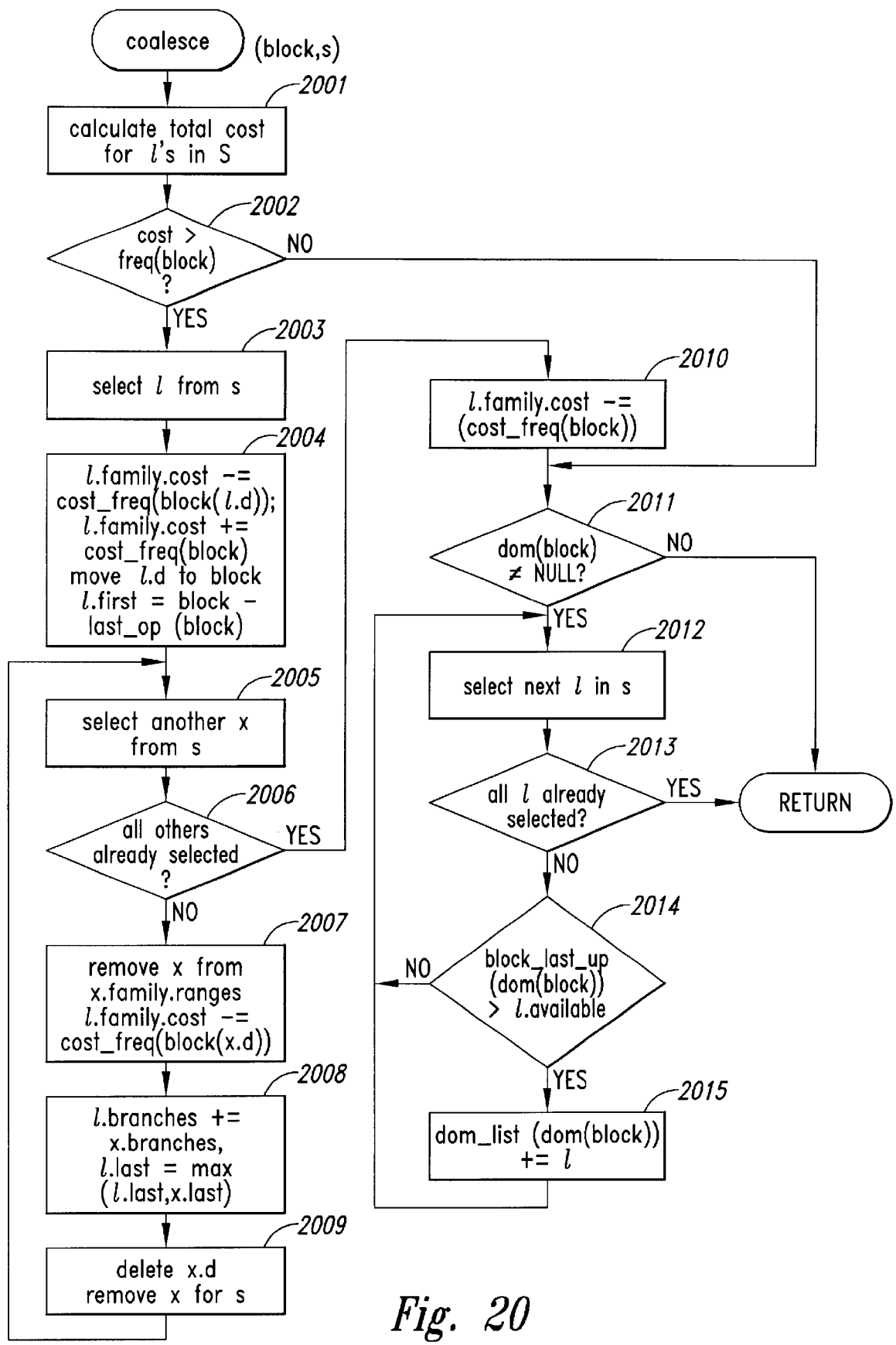
FIG. 20 is a flow diagram of an example implementation of the coalesce routine.

FIG. 20 is a flow diagram of an example implementation of the coalesce routine. This routine coalesces the live ranges in a set that are dominated by a block. This routine is passed the block and the set of live ranges. In step 2001, the routine calculates the total cost for the live ranges in the passed set ("cost=Σfreq(l.d)"). In step 2002, if the calculated cost is greater than the frequency of the passed block, then a reduction in cost would be achieved by moving the target definition into the passed block and the routine continues at step 2003, else the routine continues at step 2011 to extend the live ranges in the set to the passed block if the passed block dominates the live range. In steps 2003–2019, the routine coalesces the live ranges in the passed set. In step 2003, the routine selects a live range ("l") from the passed set. In step 2004, the routine decrements the cost of the family of the selected live range by the block that contains the target definition of the live range and increments that cost by the frequency of the passed block. The routine moves the target definition for the selected live range ("l.d") to the passed block and sets the first operation of the selected live range ("l.first") to equal the last operation of the passed block ("block_last_op(block)"). In steps 2005–2009, the routine loops selecting the other live ranges from the passed set and coalesces them into the selected live range. In step 2005, the routine selects another live range ("x") from the passed set to be coalesced. In step for 2006, if all the other live ranges have already been selected, then the routine continues at step 2010, else the routine continues at step 2007. In step 2007, the routine removes the live range to be coalesced ("x") from the ranges for its family ("x.family.ranges"). The routine also decrements the cost of the family of the selected live range by the frequency of the block that contains the live range to be coalesced. In step 2008, the routine adds the branches of the live range to be coalesced to the branches of the selected live range ("l.branches+=x.branches") and sets the last operation for the selected live range to be the maximum of the last operation for the selected live range and the live range to be coalesced. In step 2009, the routine deletes the definition for the live range to be coalesced and removes the live range to be coalesced from the set, and loops to step 2009 to select another live range. In step 2010, the routine decrements the cost of the family of the selected live range by the cost for the live ranges that were coalesced minus the frequency of the passed block ("l.family.cost-=cost-freq(block)"). In step 2011, if there is a dominator for the passed block ("dom(block)≠NULL"), then the routine continues at step 2012, else the routine returns. In steps 2012–2015, the routine loops extending the live ranges in the set. In step 2012, the routine selects the next live range in the passed set. In step 2013, if all the live ranges in the passed set have already been selected, then the routine returns, else the routine continues at step 2014. In step 2014, if the last operation of the dominator of the passed block is greater than the location of the operation that sets the computed branches ("f.avail"), then the selected live range can be added to the dominator list for the dominator of the passed block. The routine then continues at step 2015, else the routine loops to step 2012 to select the next live range in the passed set. In step 2015, the routine adds the selected live range to the dominator list of the dominator of the passed block and loops to step 2012.

Figure 21:
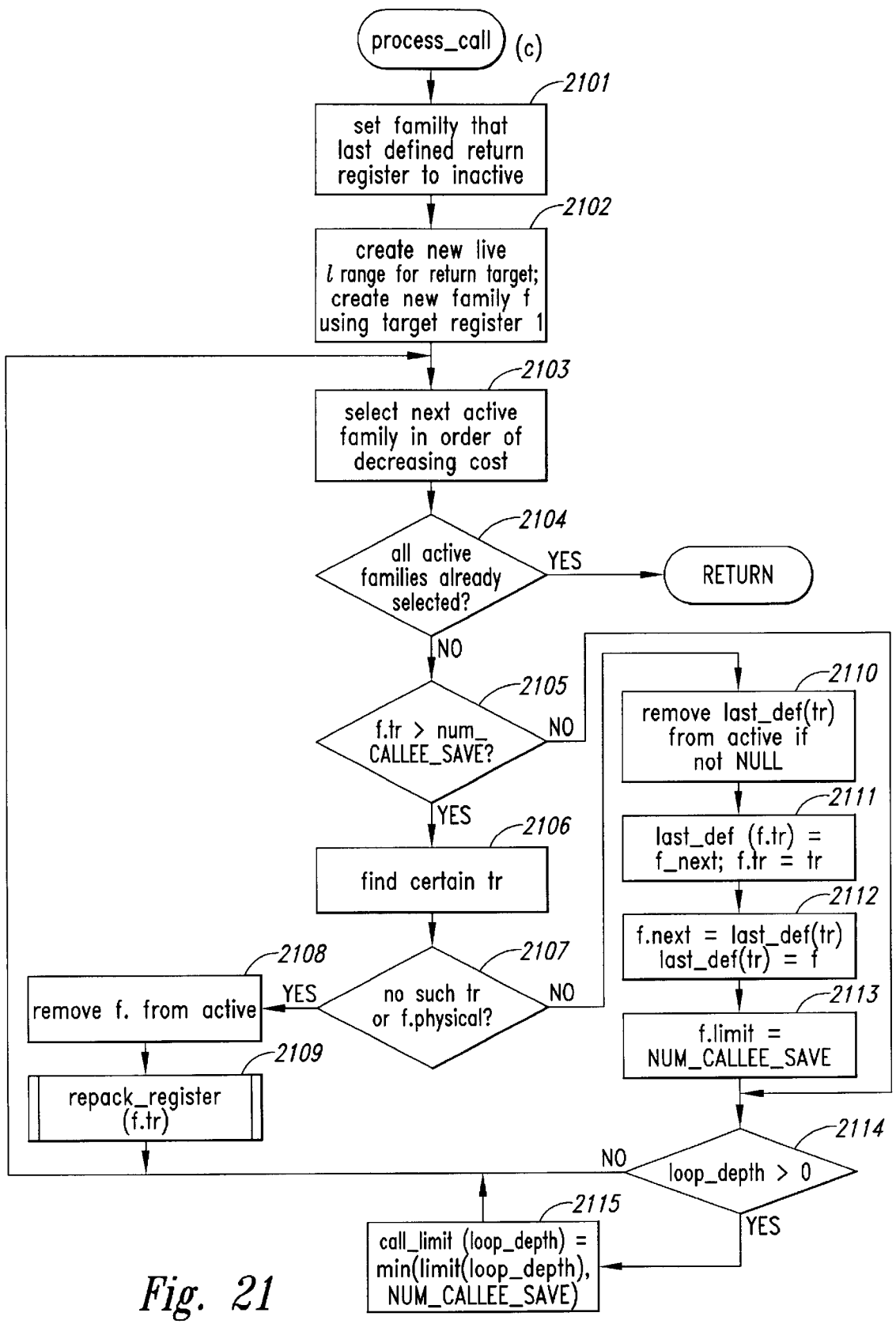
FIG. 21 is a flow diagram of an example implementation of the process_call routine.

FIG. 21 is a flow diagram of an example implementation of the process_call routine. This routine is invoked when a call is encountered and ensures that the return register (e.g., register 1) is available to store the call return address. The routine creates a live range for the return register and a family for that live range. The routine then checks whether any active families use a target register that is not a callee save register for the called function. If so, the routine tries to find a suitable callee save register for the family. If none can be found, then the routine sets that family to inactive and repacks the registers. If, however, one can be found, then the routine assigns that suitable callee save register to the family. In step 2101, the routine sets the family to which the return register was last assigned to inactive. In step 2102, the routine creates a new live range ("l") for the return register and creates a new family ("f"), assigns the target register 1, which is the return register in one embodiment, and sets the family to be constrained to its target register. In steps 2103–2109, the routine loops processing each active family. If an active family is using a target register that is not a callee save register of the called function, then the routine tries to find a callee save register that the active family can use. If no such target register is found, then the routine sets the family to inactive and repacks the registers. If such a target register is found, then the routine sets the family that was last assigned that found register to inactive and switches the selected active family to use the found register. In step 2103, the routine selects the next active family in order of decreasing cost. In step 2104, if all the active families have already been selected, then the routine returns, else the routine continues at step 2105. In step 2105, if the target register for the selected family is greater then the number of callee save registers ("NUMM_CALLEE_SAVE") for the called function, then the routine attempts to find a suitable target register for the selected active family and the routine continues at step 2106, else the routine continues at step 2114. In step 2106, the routine looks for a suitable target register ("tr") that is a callee save register for the function being called and for which no family has been assigned that register ("last_def(tr)"==NULL") or the last assigned family does not overlap the selected family ("first(last_def(tr)) >last(f)") and, if active, that family has the least cost. In step 2107, if no such target register exists or if it is bound to a certain target register ("f.physical==TRUE"), then the routine continues at step 2108, else the routine continues at step 2110. In step 2108, the routine sets the selected family to inactive. In step 2109, the routine invokes the repack_register routine passing the target register of the selected family. The routine then loops to step 2103 to select the next active family. In steps 2110–2113, the routine assigns the suitable target register to the selected family. In step 2110, the routine sets the family to which the suitable target register ("last_def(tr)") was assigned, if any, to inactive. In step 2111, the routine unlinks the selected family from its current target register ("last_def(f.tr)=f.next"). The routine also sets the target register for that selected family to the found target register ("f.tr=tr"). In step 2112, the routine links the selected family into the list of families for the found target register. In step 2113, the routine sets the limit for the family to the number of callee save registers ("NUM_CALLEE_SAVE"). In step 2114, if the call is in a loop, then the routine continues at step 2115, else the routine loops to step 2103 to select the next active family. In step 2115, the routine sets the limit for the current loop ("call_limit(loop_depth)") to the minimum of the limit for the current loop and the number of callee save registers. The routine then returns to select the next active register.

Figure 22:
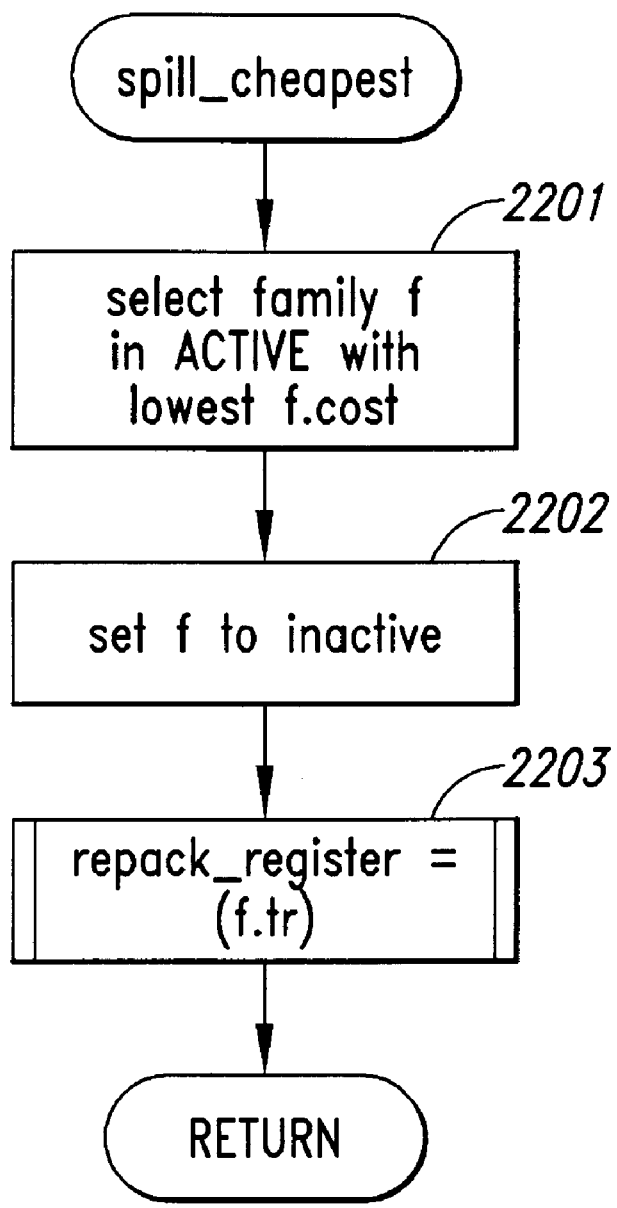
FIG. 22 is a flow diagram of an example implementation of the spill_cheapest routine.

FIG. 22 is a flow diagram of an example implementation of the spill_cheapest routine. In step 2201, the routine selects the active family with the lowest cost. In step 2202, the routine sets the selected family to inactive. In step 2203, the routine invokes the repack_register routine passing the target register of the selected active family and returns.

Figure 23:
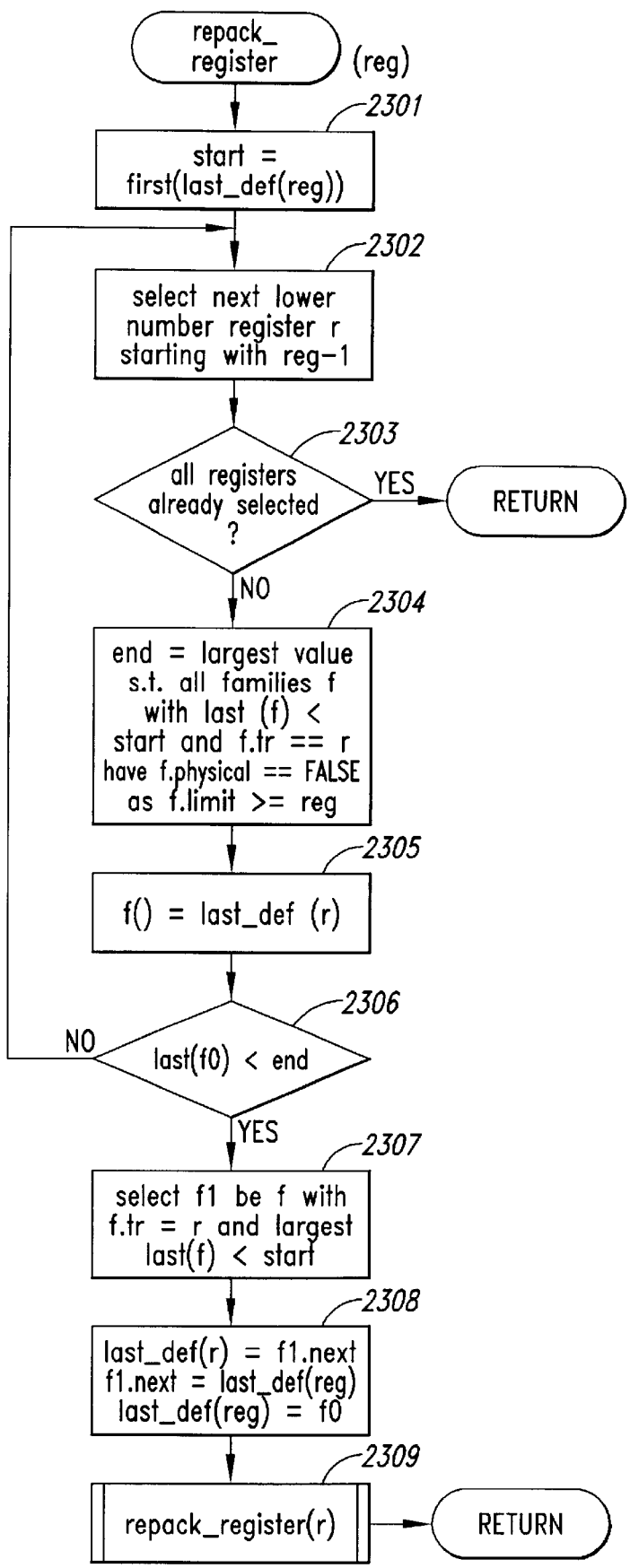
FIG. 23 is a flow diagram of an example implementation of the repack_register routine.

FIG. 23 is a flow diagram of an example implementation of the repack_register routine. This routine determines if families assigned lower numbered registers can be assigned to higher numbered registers starting at the passed register. This routine assumes that the lower numbered registers are the callee save registers of the function whose target registers are being allocated by the TRA system. The routine selects those families whose live ranges are earlier in the function than any of the live ranges of a family that uses a higher numbered target register and assigns those families to the higher numbered target register. In step 2301, the routine records the first operation in the live ranges for the family that was last assigned the passed register ("start=first(last_def(reg))"). Families whose last operation is less than recorded value can be assigned to the passed register. In step 2302–2310, the routine loops processing each lower numbered register. In step 2302, the routine selects the next lower numbered register ("r") starting with the next lower numbered register than the passed register. In step 2303, if all such registers have already been selected, then the routine returns, else routine continues at step 2304. In step 2304, the routine selects the end operation ("end") such that all families assigned to the selected target register with their last operation less than the end operation and are not constrained to a certain register ("f.physical==FALSE") and the limit (of callee save register of called functions within the family) of the family is greater than or equal to the passed register ("f.limit≧reg"). In step 2305, the routine selects the family ("f0") most recently assigned to the selected target register ("last_def(r)"). In step 2306, if there are some such families of the selected target register ("last(f0))<end"), then some families can be reassigned to the passed register and the routine continues at step 2306, else the routine loops to step 2302 to select the next lower numbered register. In step 2307, the routine selects the last family ("f") that can be moved. In step 2309, the routine unlinks those families that can be moved from the selected register and links them into the front of the linked list of families for the passed register, the routine sets the last defined family for the selected register to point to the next family of family f1 ("last_def(r)=f1.next"), sets the next family of family f1 to be the last defined family for the passed register ("f1.next=last_def(reg)"), and sets the last defined family for the passed register to be family f0 ("last_def (reg)=f0"). In step 2310, the routine recursively invokes the repack_register routine passing the selected register ("r") to repack lower numbered registers into the selected register and then returns.

Tables 5–8 illustrate the processing of a sample function by the TRA system. Table 5 contains the pseudo code for the function. The blocks are labeled B1–B8. Block B2 has two parts—B2a and B2b —to represent the call within the block. The frequency column contains the execution frequencies of each block relative to the first block. The dominator column indicates the dominator block of each block. The target requirements column indicates branches that require target definitions. The example assumes that there are 3 target registers, that there are 2 callee save registers, and that the return register is register 1.

TABLE 5

PSEUDO CODE

| Pseudo Code | | Frequency | Dom | Target Requirements |
|---|---|---|---|---|
| B1: | S1<br>do{ | 1.0 | N/A | |
| B2a: | S2<br>call f; | 8.0 | 1 | call/call return |
| B2b: | S3<br>while( ) | | | |
| B3: | S4<br>if( )then | 1.0 | 2 | branch to B6 |
| B4: | S5<br>if( )goto B8; | 0.5 | 3 | branch to B8 |
| B5: | S6<br>endif | 0.25 | 4 | |
| B6: | S7<br>if( )then | 0.75 | 3 | branch to B8 |
| B7: | S8<br>endif | 0.375 | 6 | |
| B8: | S9 | 1.0 | 3 | |

Table 6 illustrates the live ranges and family that are created when processing the pseudo code.

TABLE 6

LIVE RANGES

| Name | Branches | Target | Physical? | Family |
|---|---|---|---|---|
| lr1 | b6 | B8 | no | 1 |
| lr2 | b5 | B8 | no | 1 |
| lr3 | b3 | B6 | no | 2 |
| lr4 | b2 | B2a | no | 3 |
| lr5 | call ret | B2b | yes(1) | 4 |
| lr6 | call | f | no | 5 |

Table 7 describes the processing performed by the TRA system for each block.

TABLE 7

ACTION OF THE ALGORITHM ASSUMING NUM_CALLEE_SAVE = 2 AND MAX_LIVE = 3

| Block | Action |
|---|---|
| 8 | no action |
| 7 | no action |
| 6 | create live range lr1 and family f1<br>    f1.tr = 3<br>    active={f1}<br>    dom_list(3) = {lr1} |
| 5 | no action |
| 4 | create live range lr2 and add to existing family f1<br>    f1.ranges = {lr1,lr2}<br>    active={f1}<br>    dom_list(3) = {lr1,lr2} |
| 3 | create live range lr3 and family f2<br>    f2.tr = 2<br>    active = {f1,f2}<br>    dom_list(2) = {lr3}<br>    coalesce live ranges in dom_list(3):<br>        cost of b3 = 1, total cost of {lr1,lr2} is 1.25<br>        so move definition of lr1 to block 3<br>    remove definition of lr2 and remove lr2 from f1<br>    lr1.branches = {b6,b4}<br>    dom_list(2) = {lr1,lr3} |
| 2 | start a new loop<br>    loop_depth = 1<br>    loop_last(1) = end of block 2<br>    call_limit(1) = MAX_LIVE<br>create a live range lr4 and family f3<br>f3.tr = 1<br>active = {f1,f2,f3}<br>dom_list(1) = { lr4 }<br>no coalescing since the cost of block 2 is 8<br>    dom_list(1) = {lr1,lr3,lr4}<br>create a live range lr5 and family f4 for call return. The return address register needs to be made available. The cheapest element of the active set is removed. f1 and f2 have equal cost, assume f1 is removed.<br>    Family f3 is moved to target 3 and<br>        f3.next = f1<br>    f4.tr = 1<br>    f4.physical = yes<br>    active = {f2,f3,f4}<br>    dom_list(1) = {lr1,lr3,lr4,lr5}<br>callee-save requirement is enforced<br>Consider families f4,f3,f2 in that order. |

TABLE 7-continued

ACTION OF THE ALGORITHM ASSUMING
NUM_CALLEE_SAVE = 2 AND MAX_LIVE = 3

| Block | Action |
|---|---|
| | F4 (in 1) is already in a callee. (f4.limit = 2) |
| | f3 (in 3) is not and has higher cost than f2 so |
| | remove f2 from the active set and move f3 to target register 2. (f3.tr=2, f3.limit=2) |
| | active={f3,f4} |
| | call_limit(1) = 2 /* for inner loop */ |
| | create a live range lr6 and family f5 for the call to function f. |
| | f5.tr = 3 |
| | active = {f3,f4,f5} |
| | dom_list(1) = {lr1,lr3,lr4,lr5,lr6} |
| 1 | a loop header: attempt to extend all active live ranges to include the entire loop. In cost order, consider families f5,f4,f3. There are no target registers available in the range of 1..call_limit(1)=2 so remove family 5 from the active set. Both families 3 and 4 can be extended to the entire loop. lr4.last = last(1) lr5.last = last(1) |
| | loop_depth = 0 |
| | active = {f3,f4} |
| | attempt to coalesce. only live ranges lr4 and lr5 are still active and both have cost greater than the current block so the definitions of these live ranges are moved into block 1. |

Table 8 illustrates the final placement of the target definition and assignment of the target register.

TABLE 8

REGISTERS USED

| Pseudo Code | | Target Definition |
|---|---|---|
| B1: | S1 | |
| | tr1 = B2b | |
| | tr2 = B2a | |
| | do { | |
| B2a: | S2 | |
| | tr3 = f | |
| | call f | tr3, tr1 |
| B2b: | S3 | |
| | while( ) | tr2 |
| B3: | S4 | |
| | tr3 = B8 | |
| | tr2 = B6 | |
| | if( ) then | tr2 |
| B4: | S5 | |
| | if( ) goto B8; | tr3 |
| B5: | S6 | |
| | endif | |
| B6: | S7 | |
| | if( ) then | tr3 |
| | tr3 | |
| B7: | S8 | |
| | endif | |
| B8: | S9 | |

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method in a computer system for locating target definitions for branches of a program, the method comprising:

for basic blocks of the program having a branch with a target, determining a live range of one or more basic blocks, the basic block with the branch being an ending basic block of the live range;

identifying a basic block that dominates two live ranges with ending basic blocks having a branch with the same target; and locating a target definition for the branches of the ending basic blocks of the live ranges that are dominated by the identified basic block in the identified basic block.

2. The method of claim 1 wherein the basic blocks of a program are processed in reverse order of their position in the program.

3. The method of claim 1 wherein the identified basic block is not a preheader of a loop.

4. The method of claim 1 including selecting a target register for the target definition giving preference to callee save registers.

5. The method of claim 4 wherein the preference is given when a live range contains a function invocation.

6. The method of claim 1 wherein a live range of basic blocks has a starting basic block and a target definition for the branch of the ending basic block of the live range can be placed in the starting basic block.

7. The method of claim 1 including coalescing two live ranges into a single live range when a basic block that dominates the two live ranges with ending basic blocks having a branch with the same target are identified.

8. The method of claim 1 including when the basic blocks of the program are within a function selecting a target register for the target definition giving preference to non-callee save registers.

9. A computer system for locating target definitions for branches of a program, comprising:

a component that, for basic blocks of the program having a branch with a target, determines a live range of one or more basic blocks, the basic block with the branch being an ending basic block of the live range;

a component that identifies a basic block that dominates live ranges with ending basic blocks having a branch with the same target; and a component that coalesces the dominated live ranges so that a target definition for the branches of the ending basic blocks of the coalesced live ranges can be located in the identified dominating basic block.

10. The computer system of claim 9 wherein the basic blocks of a program are processed in reverse order of their position in the program.

11. The computer system of claim 9 wherein the identified basic block is not a preheader of a loop.

12. The computer system of claim 9 including a component that selects a target register for the target definition giving preference to callee save registers.

13. The computer system of claim 12 wherein the preference is given when a live range contains a function invocation.

14. The computer system of claim 12 wherein the preference is given when the basic blocks of the live ranges are not within a function.

15. The computer system of claim 9 wherein a live range of basic blocks has a starting basic block and a target definition for the branch of the ending basic block of the live range can be placed in the starting basic block.

16. The computer system of claim 9 wherein one of the coalesced live ranges was itself coalesced from other live ranges.

17. The computer system of claim 9 including when the basic blocks of the program are within a function selecting a target register for the target definition giving preference to non-callee save registers.

18. A computer-readable medium containing instructions for controlling a computer system to locate target definitions for branches of a program, by a method comprising:

identifying live ranges of one or more basic blocks, each live range having a branch in an ending basic block of the live range;

identifying a basic block that dominates two live ranges with ending basic blocks having a branch with the same target; and locating a target definition for the branches of the ending basic blocks of the live ranges that are dominated by the identified basic block in the identified basic block.

19. The computer-readable medium of claim 18 wherein the basic blocks of a program are processed in reverse order of their position in the program.

20. The computer-readable medium of claim 18 wherein the identified basic block is not a preheader of a loop.

21. The computer-readable medium of claim 18 including selecting a target register for the target definition giving preference to callee save registers.

22. The computer-readable medium of claim 21 wherein the preference is given when a live range contains a function invocation.

23. The computer-readable medium of claim 18 wherein a live range of basic blocks has a starting basic block and a target definition for the branch of the ending basic block of the live range can be placed in the starting basic block.

24. The computer-readable medium of claim 18 including coalescing two live ranges into a single live range when a basic block that dominates the two live ranges with ending basic blocks having a branch with the same target are identified.

25. The computer-readable medium of claim 18 including when the basic blocks of the program are within a function selecting a target register for the target definition giving preference to non-callee save registers.

26. A computer system for locating target definitions for branches of a program, comprising:

means for identifying a live range of one or more basic blocks, each live range having a branch;

means for identifying a basic block that dominates live ranges having a branch with the same target; and means for coalescing the dominated live ranges so that a target definition for the branches of the coalesced live ranges can be located in the identified dominating basic block.

27. The computer system of claim 26 wherein the basic blocks of a program are processed in reverse order of their position in the program.

28. The computer system of claim 26 wherein the identified basic block is not a preheader of a loop.

29. The computer system of claim 26 including a component that selects a target register for the target definition giving preference to callee save registers.

30. The computer system of claim 29 wherein the preference is given when a live range contains a function invocation.

31. The computer system of claim 29 wherein the preference is given when the basic blocks of the live ranges are not within a function.

32. The computer system of claim 26 wherein a target definition for the branch of a live range can be placed in a starting block of the live range.

33. The computer system of claim 26 wherein one of the coalesced live ranges was itself coalesced from other live ranges.

34. The computer system of claim 26 including, when the basic blocks of the program are within a function, selecting a target register for the target definition giving preference to non-callee save registers.

* * * * *

UNITED STATES PATENT AND TRADEMARK OFFICE
CERTIFICATE OF CORRECTION

PATENT NO.   : 6,321,379 B1  
DATED        : November 20, 2001  
INVENTOR(S)  : Charles David Callahan, II It is certified that error appears in the above-identified patent and that said Letters Patent is hereby corrected as shown below:

Column 5,  
Line 33, paragraph beginning with "The" should be part of preceding paragraph;

Column 13,  
Line 55, delete the comma after "suitable" and insert a period;  
Line 64, "f-next" should be -- f.next --; and Column 15,  
Line 33, "NUMM" should be -- NUM. --

Signed and Sealed this

Second Day of April, 2002

Attest:

JAMES E. ROGAN  
Attesting Officer   Director of the United States Patent and Trademark Office